United States Patent
Mizutani et al.

(12)

(10) Patent No.: US 6,590,548 B1
(45) Date of Patent: Jul. 8, 2003

(54) DISPLAY APPARATUS AND AN IMAGE INPUT APPARATUS USED FOR THE SAME

(75) Inventors: Yasuhiro Mizutani, Mie (JP); Tooru Matsumoto, Ichinomiya (JP); Kenichiro Takada, Kuwana (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/246,697

(22) Filed: Feb. 9, 1999

(30) Foreign Application Priority Data

| Feb. 9, 1998 | (JP) | .......................................... 10-044345 |
| Apr. 9, 1998 | (JP) | .......................................... 10-097642 |
| Jan. 18, 1999 | (JP) | .......................................... 11-009422 |

(51) Int. Cl.[7] .............................................. G09G 3/00
(52) U.S. Cl. ....................... 345/32; 382/275; 348/14.01
(58) Field of Search ................................ 359/1, 15, 24, 359/28, 30, 35, 452–459, 460; 348/744, 14.07–14.16; 353/20, 37, 50; 345/32; 382/274, 275

(56) References Cited

U.S. PATENT DOCUMENTS

| 3,885,096 A | * | 5/1975 | Inuiya .......................... 178/15 |
| 4,721,361 A | * | 1/1988 | van de Ven .................... 355/45 |
| 5,400,069 A | * | 3/1995 | Braun et al. .............. 348/14.08 |
| 5,625,489 A | * | 4/1997 | Glenn ....................... 264/1.34 |
| 5,812,703 A | * | 9/1998 | Juen et al. ................... 382/274 |
| 6,198,554 B1 | * | 3/2001 | Kanda et al. ................... 359/1 |

FOREIGN PATENT DOCUMENTS

EP    0 722 103 A2    5/1997

OTHER PUBLICATIONS

JPP–5333435 (Abstract).
JPP–5–88020 (Abstract).
JPP–6–30406 (Abstract).

* cited by examiner

Primary Examiner—Richard Hjerpe
Assistant Examiner—Alexander Eisen
(74) Attorney, Agent, or Firm—Harness, Dickey & Pierce, PLC

(57) ABSTRACT

A display apparatus according to one aspect of the first invention includes: an irradiating unit for generating signal light which records information to be displayed; a light-transmitting type screen (or hologram screen) which transmits the signal light input by the irradiating unit to an observer; and a reflection preventing member provided to either both sides, i.e., observer's side and rear side, or any one side, of the light-transmitting type screen (or hologram screen). Further, an image input apparatus according to the second invention used in the above display apparatus includes: an irradiating unit for generating signal light which records information to be displayed; a display unit for projecting the signal light irradiated by the irradiating unit; an image input unit for inputting an desired object which exists at another side of the display unit, through the display unit from one side of the display unit, as an image signal; and a noise eliminating unit for eliminating at least a part of image component except for the desired object.

1 Claim, 28 Drawing Sheets

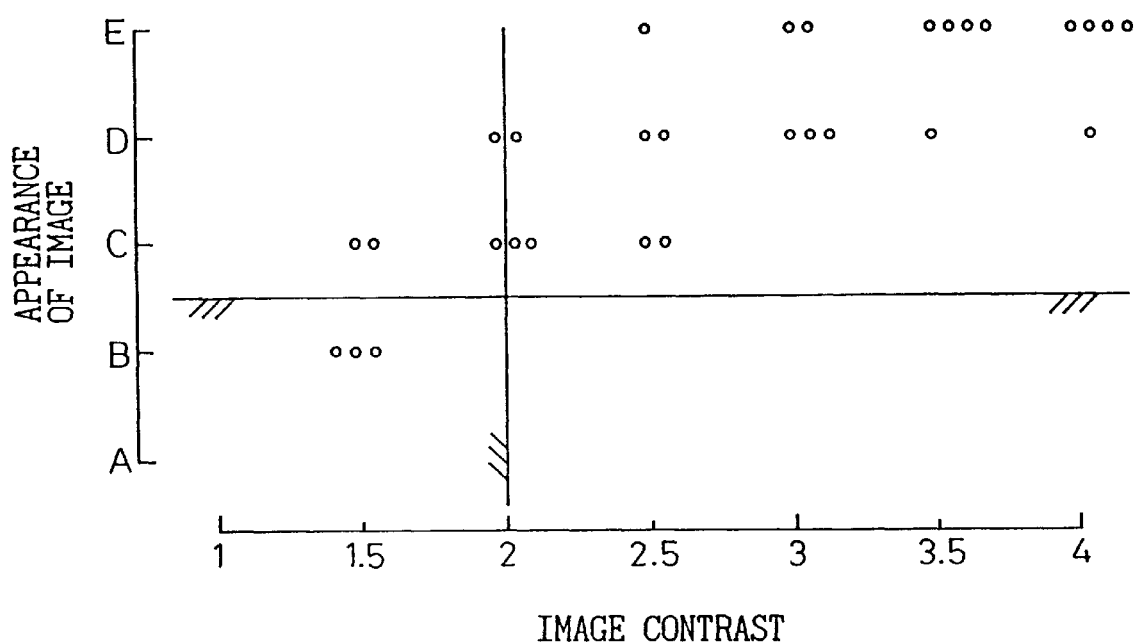

↙ : S-POLARIZED LIGHT

↻ : CIRCULARLY POLARIZED LIGHT

↙ : S-POLARIZED LIGHT

↕ : P-POLARIZED LIGHT

Fig.21

| | REFLECTION FACTOR AT FRONT SIDE (%) | REFLECTION FACTOR AT REAR SIDE (%) | A SUM OF REFLECTION FACTOR (%) | IMAGE CONTRAST |
|---|---|---|---|---|
| (1) BOTH SURFACES | 0.8 | 0.6 | 1.4 | 3.7 |
| (2) FRONT SURFACE | 0.8 | 3.2 | 4.0 | 2.1 |
| (3) NO REFLECTION PREVENTING MEMBER FOR BOTH SIDES | 4.0 | 3.2 | 7.2 | 1.6 |

BRIGHTNESS OF IMAGE 500cd/m², BRIGHTNESS OF TRANSMITTING NOISE LIGHT AT BACKGROUND 45cd/m²

Fig.22

| | BRIGHTNESS OF IMAGE | BACKGROUND OF OBSERVER'S SIDE | | | BACKGROUND OF REAR SIDE | IMAGE CONTRAST |
| --- | --- | --- | --- | --- | --- | --- |
| | | REFLECTION FACTOR AT FRONT SIDE (%) | REFLECTION FACTOR AT REAR SIDE (%) | A SUM OF REFLECTION FACTOR (%) | LIGHT-TRANSMITTANCE OF POLARIZED OPTICAL ELEMENT AND HOLOGRAM SCREEN (%) | |
| (1) NO REFLECTION PREVENTING MEMBER AND NO POLARIZED OPTICAL ELEMENT | 500 | 4.0 | 3.2 | 7.2 | 90 (=100×0.9) | 1.6 |
| (2) SECOND EMBODIMENT | 500 | 0.8 | 1.2 | 2.0 | 54 (=60×0.9) | 2.6 |
| (3) THIRD EMBODIMENT | 500 | 0.8 | 0.2 | 1.0 | 54 (=60×0.9) | 3.4 |

MAXIMUM BRIGHTNESS AT BACKGROUND OF OBSERVER'S SIDE; 10000cd/m$^2$

MAXIMUM BRIGHTNESS AT BACKGROUND OF REAR SIDE; 200cd/m$^2$

Fig. 23

| LIGHT-TRANSMITTANCE OF HALF TRANSMITTING OPTICAL MATERIAL (%) | BRIGHTNESS OF IMAGE | BACKGROUND OF OBSERVER'S SIDE | | | BACKGROUND OF REAR SIDE | IMAGE CONTRAST |
|---|---|---|---|---|---|---|
| | | REFLECTION FACTOR AT FRONT SIDE (%) | REFLECTION FACTOR AT REAR SIDE (%) | A SUM OF REFLECTION FACTOR (%) | LIGHT TRANSMITTANCE (%) | |
| (1) 80 | 500.0 | 0.8 | 2.5 | 3.3 | 80 | 2.0 |
| (2) 60 | 500.0 | 0.8 | 1.4 | 2.2 | 60 | 2.5 |
| (3) 40 | 500.0 | 0.8 | 0.6 | 1.4 | 40 | 3.3 |
| (4) 0 (NON-TRANSPARENT) | 500.0 | 0.8 | 0 | 0.8 | 0 | 4.1 |

MAXIMUM BRIGHTNESS AT BACKGROUND OF OBSERVER'S SIDE; 10000cd/m$^2$

MAXIMUM BRIGHTNESS AT BACKGROUND OF REAR SIDE; 200cd/m$^2$

DISPLAY APPARATUS AND AN IMAGE INPUT APPARATUS USED FOR THE SAME

BACKGROUND OF THE INVENTION

1. Field of the Invention

The present invention relates to a display apparatus and an image input apparatus used for the same, using a screen or a screen formed of a hologram. In particular, a first invention relates to a display apparatus which can suppress noise light coming into an observer's eyes so that it is possible to improve the contrast of an image displayed on the screen, and a second invention relates to an image input apparatus which can be effectively utilized in a TV conference system, a TV telephone system, etc., and can eliminate noise components contained in an input image.

2. Description of the Related Art

First, the related arts for the first invention will be explained in detail below.

As a display apparatus which focuses an image on a screen, there is a known projector-type display apparatus which utilizes a liquid crystal as a display unit. In the display apparatus of this type, first, the light is irradiated from a predetermined direction to either a transmitting type liquid crystal or a reflecting type liquid crystal. Next, the signal light including the image formed on the liquid crystal is emitted. Further, the image to be displayed (below, a display image) contained in the signal light is focused on the screen through a focus lens. Still further, either transmitted scattered-light or reflected scattered-light of the display image, which is emitted from the screen, is visually recognized by an observer.

As another type of the projector, a CRT (Cathode Ray Tube) type is used instead of a liquid crystal type. In the CRT type projector, the display image is focused on the screen by emitting three colored beams each formed of red (R), green (G) and blue (B).

In the display apparatus utilizing a normal screen mentioned above, there is a problem in which the contrast of the displayed image deteriorates due to the incoming light, from the surroundings, on the screen in a bright environment. Accordingly, the above display apparatus can be used only in a dark environment where the incoming light is poor and the brightness is limited.

In order to solve the above problem, a first solution lies in use of an optical element according to the present invention (i.e., a reflection preventing member, a polarized optical element, a light control optical member, etc.) which is explained in detail in the description of the present invention.

Further, a second solution lies in use of a hologram as the screen (below, a hologram screen). According to the hologram screen, the characteristic of the screen can function as a scattering body for only particular light input from a particular direction due to a diffraction effect of the hologram.

That is, when the hologram which recorded the scattered light is utilized as the screen, the light is scattered for only the irradiated light (i.e., signal light) input from the particular direction, and other light input from other directions are transmitted or reflected (i.e., a regular reflection) on the screen.

As a result, almost all light input from the surroundings is not scattered on the screen. Accordingly, it is possible to solve a problem in which the brightness at the background of the screen is increased, and the contrast of the displayed image can be improved. This conventional art has been disclosed, for example, in the Japanese Unexamined Patent Publication (Kokai) No. 5-333435.

Further, in addition to the above structure using the hologram screen, there is a method in which an external light absorbing member (for example, black paint, etc.) which absorbs the external light is provided inside of the hologram screen in order to absorb the external light. This art has been disclosed, for example, in the Japanese Unexamined Patent Publication (Kokai) No. 5-88020.

In this art, however, there is another problem as explained below. That is, when the strong external light, such as sunlight or the light of a lamp, which is input from the direction opposite to the signal light, is input on the hologram screen, the diffracted light is reflected on the rear side of the hologram screen, and the reflected light is directed to the observer. As a result, the contrast of the image becomes worse and the observer is very hard to observe the displayed image.

As a solution for the above problem, the following method has been proposed. That is, a reflection preventing member is provided to the rear side of the screen, and a polarized optical element is provided on the observer's side of the hologram screen.

In the display apparatus using the hologram screen, as explained above, when strong external light, such as sunlight or the light of the lamp, is input to the hologram screen, it is possible to reduce noise light caused by the scattering or diffraction on the hologram screen.

There are problems, however, in the above explained conventional arts as briefly explained below. That is, in the conventional hologram screen, regardless of the diffraction, there is the difference in refractive index on the boundary surface between the external air and the structural member of the hologram screen in the observer's side and in the rear side, and, as a result, reflection occurs in the boundary surface. As a result, the background at the observer's side overlaps with the image displayed on the hologram screen so that there is a problem in which it is difficult to see the image due to deterioration of the contrast of the image.

Further, since the hologram screen has a light-transmitting characteristic, and since the observer can see the rear side of the image (i.e., a rear side of the hologram screen), when there is internal light, such as the light from a room lamp, on the rear side of the image, the internal light is overlapped with the image so that the contrast of the image is deteriorated and the observer is difficult to see the displayed image. The above two problems are explained in detail with reference to FIGS. 11 and 12 below.

Next, the related arts for the second invention will be explained in detail below.

For example, when taking a picture of a speaker through a camera in a TV conference system, a TV telephone system, a prompter system, etc., the viewline of the speaker is usually directed to a display unit of the system, and is not directed to the camera (i.e., an image input unit). Accordingly, in actual use of the TV conference system or the TV telephone system, there is a problem in which a feeling of disorder occurs between speakers since the viewline of one speaker does not meet that of another speaker through the camera.

As one solution of this problem, there is a known art disclosed in, for example, Japanese Unexamined Patent Publication (Kokai) No. 6-30406. According to this document, in order for the viewlines between speakers to meet, the signal light in which the information to be displayed is recorded therein is irradiated to a screen which has the function of transmitting or scattering the light in accordance with the incident angle of the light, the speaker's image is displayed on the screen, and the image of the speaker (i.e., the observer who watches the display unit) is captured by the image input unit (i.e., a camera) through the screen.

As another solution, there is another known art disclosed in, for example, Japanese Unexamined Patent Publication (Kokai) No. 9-168141. According to this document, the signal light in which the information to be displayed is recorded therein is irradiated to the hologram screen (i.e., as mentioned above, the hologram is used as the screen), another speaker is displayed on the hologram screen, and the image of the speaker (i.e., the observer who watches the display unit) is captured by the image input unit (i.e., a camera) through the hologram screen. There are, however, subjects to be solved in these conventional arts as explained in detail with reference to FIGS. 29 to 31 below.

SUMMARY OF THE INVENTION

The object of the first invention is to provide a display apparatus which can suppress the first noise light caused by the background on the observer's side and the second noise light caused by the background on the rear side of the hologram screen so that it is possible to increase the contrast of the normal image to be displayed on the screen or the hologram screen.

Further, the object of the second invention is to provide an image input apparatus used for the display apparatus defined in the first embodiment, which can eliminate noise components contained in the image signal and can provide a desirable clear image.

In the following descriptions, a light-transmitting type screen (or a hologram screen) is provided between an irradiating unit and an observer. On the other hand, a light-reflecting type screen (or a hologram screen) is provided to one side of the irradiating unit and the observer, as shown in the drawings.

In accordance with one aspect of the first invention, there is provided a display apparatus including: an irradiating unit for generating signal light which records information to be displayed; a light-transmitting type screen (or a hologram screen) which transmits the signal light input by the irradiating unit to an observer; and a reflection preventing member provided to either both sides, i.e., the observer's side and the rear side, or any one side, of the light-transmitting type screen (or the hologram screen).

The above reflection preventing member can reduce the reflection from the screen or hologram screen at the background of the observer's side, and the intensity of noise light directed to the observer can be considerably reduced so that it is possible to increase the contrast of the image.

In accordance with another aspect of the first invention, there is provided a display apparatus including: an irradiating unit for generating signal light which records information to be displayed, and the signal light being linear polarized light; a light-transmitting type screen (or the hologram screen) which transmits the signal light input by the irradiating unit to an observer; and a polarized optical element provided to the rear side of the light-transmitting type screen (or the hologram screen) and formed so as to selectively transmit the linear polarized light.

The polarized optical element can reduce the second noise from the background of the rear side to approximately one sixth or one seventh. Further, since the signal light (i.e., a linear polarized light) is orthogonally crossed to an absorption axis of the polalized optical element, almost all signal light from the irradiating unit can pass through the hologram screen.

In accordance with still another aspect of the first invention, there is provided a display apparatus including: an irradiating unit for generating signal light which recorded information to be displayed, and the signal light being linear polarized light; a light-transmitting type screen (or the hologram screen) which transmits the signal light input by the irradiating unit to an observer; a polarized optical element provided to the rear side of the light-transmitting type screen (or the hologram screen) and formed so as to selectively transmit the linear polarized light; and a reflection preventing member provided to the outside of the polarized optical element.

The polarized optical element can reduce not only the second noise from the background on the rear side, but also a first noise in which the background on the observer's side is reflected at the rear of the hologram screen. Accordingly, it is possible to increase the contrast of the image for a first noise.

In accordance with still another aspect of the first invention, there is provided a display apparatus including: an irradiating unit for generating signal light which records information to be displayed, the signal light being linear polarized light; a light-transmitting type screen (or the hologram screen) which transmits the signal light input by the irradiating unit to an observer; a reflection preventing member provided to the observer's side of the light-transmitting type screen (or the hologram screen); and a polarized optical element provided to the rear side of the light-transmitting type screen (or the hologram screen) and formed so as to selectively transmit the linear polarized light.

In accordance with still another aspect of the first invention, there is provided a display apparatus including: an irradiating unit for generating signal light which records information to be displayed, and the signal light being linear polarized light; a light-transmitting type screen (or the hologram screen) which transmits the signal light input by the irradiating unit to an observer; a reflection preventing member provided to the observer's side of the light-transmitting type screen (or the hologram screen); a polarized optical element provided to the rear side of the light-transmitting type screen (or the hologram screen) and formed so as to selectively transmit the linear polarized light; and another reflection preventing member provided to the outside of the polarized optical element.

In accordance with still another aspect of the first invention, there is provided a display apparatus including: an irradiating unit for generating signal light which records information to be displayed; a light-reflecting type screen (or the hologram screen) which reflects the signal light input by the irradiating unit to an observer; and a reflection preventing member provided to either both sides, i.e., the observer's side and the rear side, or any one side, of the light-reflecting type screen (or the hologram screen).

In accordance with still another aspect of the first invention, there is provided a display apparatus including: an irradiating unit for generating signal light which records information to be displayed; a light-reflecting type screen (or the hologram screen) which reflects the signal light input by the irradiating unit to an observer; and a half-transparent or non-transparent optical member, or a polarized optical member provided to the rear side of the light-reflecting screen (or the hologram screen).

In accordance with still another aspect of the first invention, there is provided a display apparatus including: an irradiating unit for generating signal light which records information to be displayed; a light-reflecting type screen (or the hologram screen) which reflects the signal light input by the irradiating unit to an observer; a reflection preventing member provided to the observer's side of the light-reflecting type screen (or the hologram screen); and a half-transparent or not-transparent optical member, or a polarized optical member provided to rear side of the light-reflecting type screen (or the hologram screen).

In a preferred embodiment, an image contrast of the display apparatus is 2 or more.

In another preferred embodiment, a luminous reflection factor of the reflection preventing member is 2.5(%) or less.

In still another preferred embodiment, a light-transmittance factor of the polarized optical element is 65(%) or less.

In still another preferred embodiment, the reflection preventing members provided to both sides, i.e., the observer's side and the rear side, of the light-transmitting type screen (or the hologram screen) or the light-reflecting type screen (or the hologram screen) are lustrous.

In still another preferred embodiment, the reflection preventing members provided to both sides, i.e., the observer's side and the rear side, of the light-transmitting type screen (or the hologram screen) or the light-reflecting type screen (or the hologram screen) are a non-glare type optical members.

In the present invention, the term "lustrous" means a low reflection factor in which a thin film is formed on the surface so as to reduce the reflection factor based on an interference effect. Further, the term "non-glare" means low scattered light by scattering the incident light on an uneven surface.

In still another preferred embodiment, the reflection preventing members provided to both sides, i.e., the observer's side and the rear side, of the light-transmitting type screen (or the hologram screen) or the light-reflecting type screen (or the hologram screen) are a lustrous non-glare type reflection preventing member having both a lustrous-type reflection preventing characteristic and a non-glare type reflection preventing characteristic.

In still another preferred embodiment, a light-control type optical member is provided between the reflection preventing member at the observer's side and the light-transmitting type screen (or the hologram screen) or the light-reflecting type screen (or the hologram screen).

In accordance with one aspect of the second invention, there is provided an image input apparatus used in a display apparatus including: an irradiating unit for generating signal light which records information to be displayed; a display unit for projecting the signal light irradiated by the irradiating unit; an image input unit for inputting an desired object which exists another side of the display unit, through the display unit from one side of the display unit, as an image signal; and a noise eliminating unit for eliminating at least a some of the image component except for the desired object.

The noise eliminating unit can considerably reduce noise components contained in the image signals input to the image input unit so that it is possible to provide good appearance of the image on the display apparatus.

In a preferred embodiment, the noise eliminating unit is directly provided to the display unit.

In another preferred embodiment, the noise eliminating unit is a reflection preventing member which is provided to either both sides, i.e., the one side and another side, or any one side of the display unit.

In still another preferred embodiment, a reflection factor of the reflection preventing member is 2.5(%) or less.

In still another preferred embodiment, the noise eliminating unit is at least any one kind of a polarized optical member, a light-control type optical member and a colored optical member.

In still another preferred embodiment, the noise eliminating unit is an image processing circuit for eliminating noise signals input by the image input unit.

In still another preferred embodiment, the image processing circuit eliminates the noise signals of the image from the information to be displayed from the irradiating unit and the input image signal from the image input unit.

In still another preferred embodiment, the image processing circuit inputs noise signals, which are observed from a side of the image input unit, to the image input unit when there are no object at another side of the display unit and no irradiation light irradiated from the irradiating unit to the display unit; after the noise signals are recorded, when the desired image which exist another side of the display unit, the recorded noise signals are eliminated by the image signal input by the image input unit.

In still another preferred embodiment, the noise eliminating unit has both noise eliminating unit, which is directly provided to the display unit, and the image processing circuit for eliminating noise signals from the image signal input by the image input unit.

In still another preferred embodiment, the noise eliminating unit has at least any one kind of a reflection preventing member, a polarized optical member, a light-control type optical member and a colored optical member, these provided to the display unit; and an image processing circuit for eliminating noise signals from the image signal input by the image input unit.

In still another preferred embodiment, the display unit is a light-transmitting type screen or a light-reflecting type screen.

In still another preferred embodiment, the display unit is a light-transmitting type hologram screen or a light-reflecting type hologram screen.

In still another preferred embodiment, the irradiating unit, the display unit and the image input unit are provided integratedly within a box, and brightness at an inside of the box is lower than the brightness at an outside of the box.

In still another preferred embodiment, the image input apparatus further comprises, an amount of light detecting unit for detecting the amount of light at peripheral portions of the display unit, and an irradiation intensity adjusting unit for changing the irradiation intensity of the irradiation unit.

BRIEF DESCRIPTION OF THE DRAWINGS

In the drawings:

FIG. 13 is a graph for explaining the relationship between the appearance and the contrast of the image;

FIG. 21 is a view for explaining the relationship between the reflection preventing film and the contrast of the image;

FIG. 22 is a view for explaining the relationship between the reflection preventing film or the polarization optical element and the contrast of the image;

FIG. 23 is a view for explaining the relationship between the light transmittance and the contrast of the image;

DESCRIPTION OF THE PREFERRED EMBODIMENTS

The following descriptions are given as to the first invention.

Before describing preferred embodiments of the first invention, problems in the above-explained conventional arts will be explained with reference to FIGS. 11 and 12.

Figure 11:
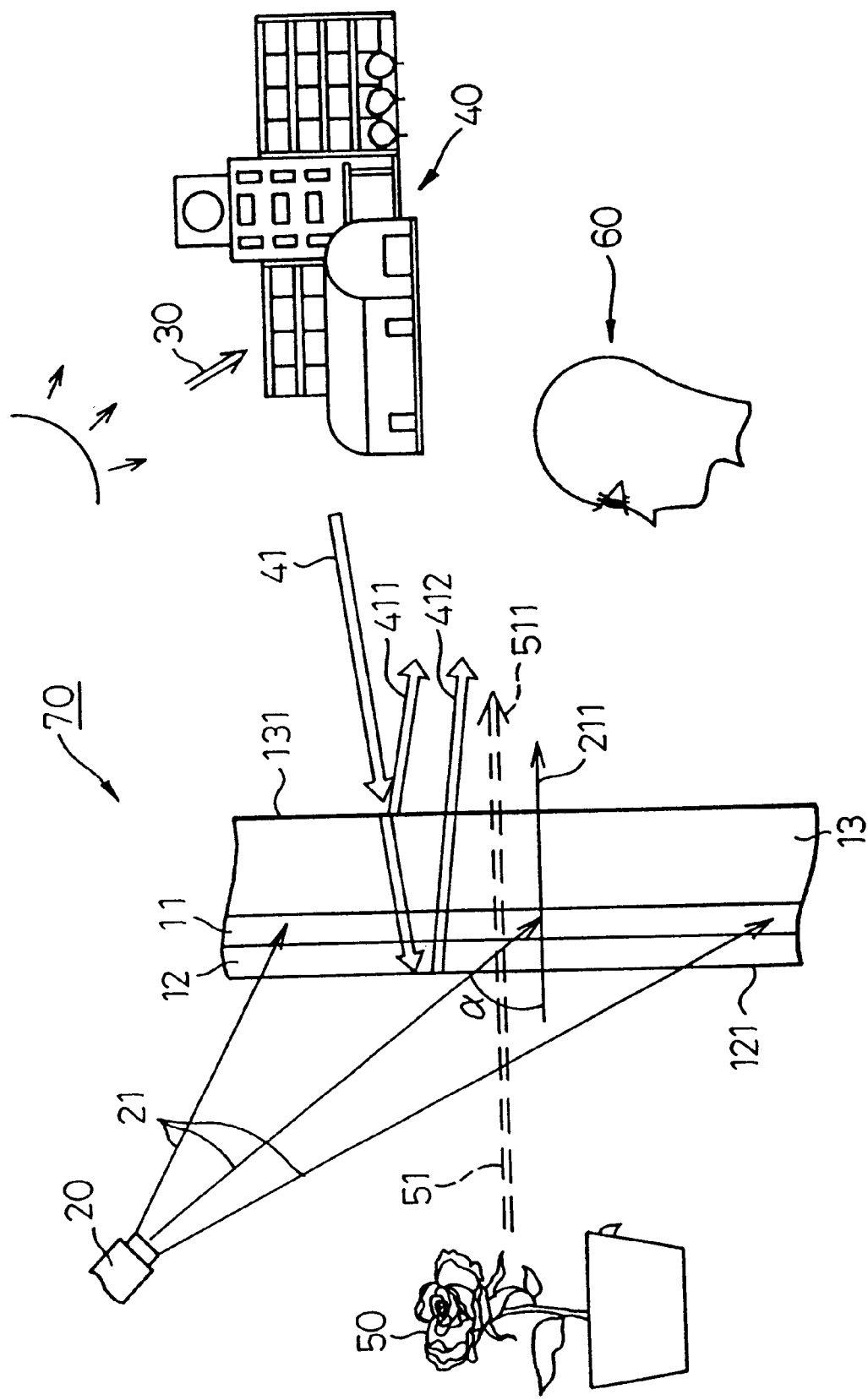
FIG. 11 is an explanatory view for explaining problems in a conventional display apparatus using the transmitting type hologram.

FIG. 11 is an explanatory view for explaining problems in a conventional display apparatus using the transmitting type hologram. The transmitting type hologram screen 70 is formed by a cover film 12 and a hologram 11 provided between a transparent substrate 13 and the cover film 12.

As shown in FIG. 11, the normal image can be obtained by an observer 60 through the light 211 in which the signal light 21 from an irradiating unit 20 is diffracted and transmitted by the hologram 11 of the transmitting type hologram screen 70. In this case, two kinds of noise components (i.e., a subject to be solved) occur in the normal image as explained below.

Regarding the first noise component, the background sight 40, for example, a building, positioned in the rear of the observer 60 is illuminated brightly by the strong light, such as the sunlight 30 or the light of the lamp. The light 41 from the background 40 is reflected by the surface 131 of a transparent substrate (i.e., a glass plate 13 in FIG. 11) and a rear surface 121 of a cover film 12, and these reflected light 411 and 412 are directed to the observer 60. Accordingly, these reflected light 411 and 412 are input to the observer's eyes as the first noise.

In this case, since a sum of both reflection factors of the surface 131 and the rear surface 121 is approximately 8%, the contrast to the normal image is considerably reduced due to the first noise in the bright environment, such as fine weather or strong light.

On the other hand, regarding the second noise, the light 51 from the background 50 at the rear side of the transmitting type hologram screen 70 (i.e., a side of the irradiating unit 20), for example, a flower, is transmitted through the transmitting type hologram screen 70, and the transmitted light 511 is input to the observer's eyes as the second noise.

In the transmitting type hologram screen 70, the signal light from the irradiating unit 20 is diffracted with high efficiency, but other light 41 and 51 except for the signal light 21 are not diffracted by the transmitting type hologram screen 70. For the above reason, the light caused by reflections at the rear surface 121 and the front surface 131 of the transmitting type hologram screen 70 are mainly attenuated, and the light-transmittance factor of the transmitting type hologram screen 70 is approximately 90% or more so that almost all light is transmitted through the transmitting type hologram screen 70.

Accordingly, the reduction of the contrast of the normal image becomes considerable for the second noise even if there is a normal brightness of the room in the rear side of the transmitting type hologram screen 70.

Figure 12:
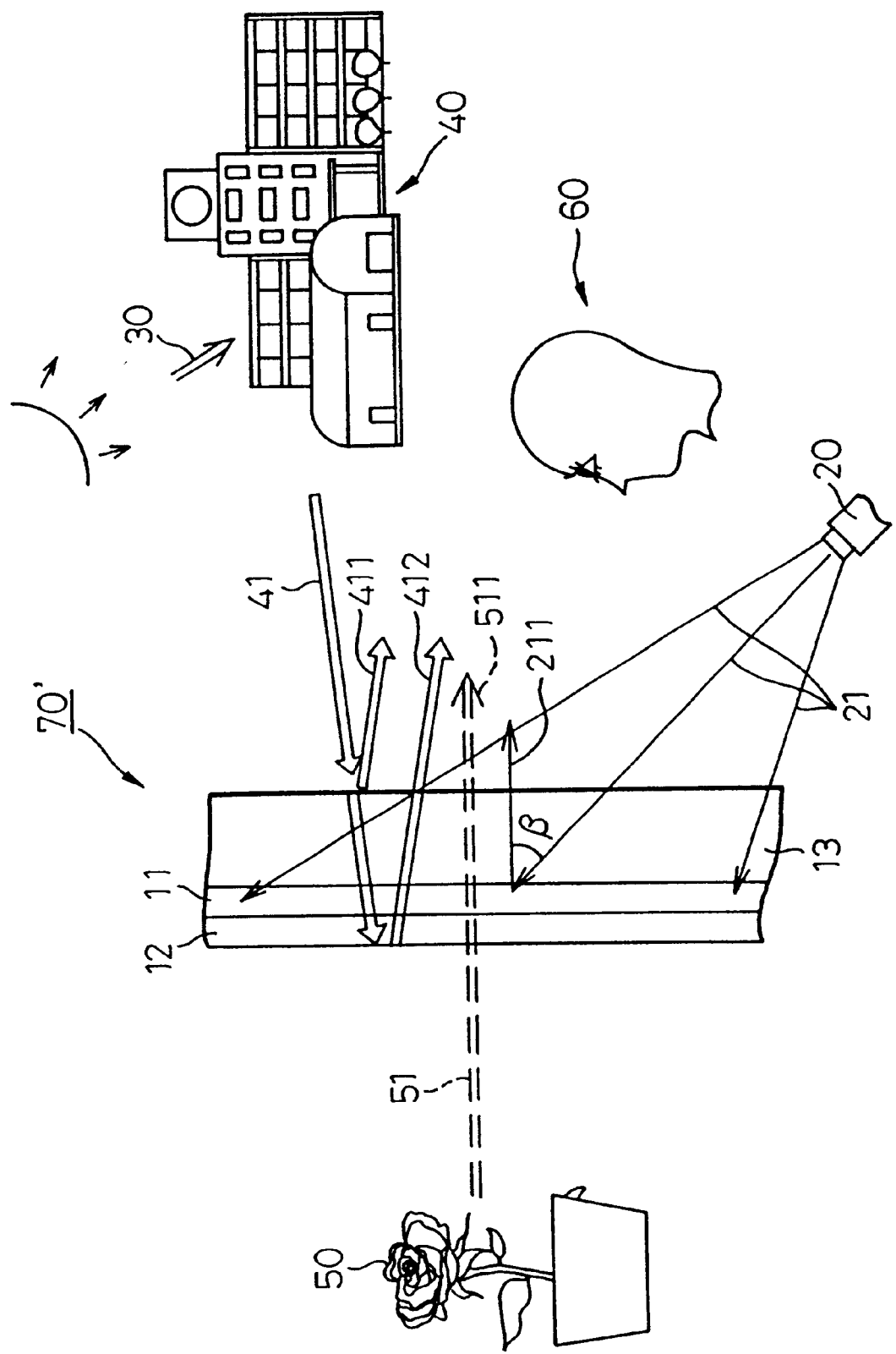
FIG. 12 is an explanatory view for explaining problems in the conventional display apparatus using the reflecting type hologram.

FIG. 12 is an explanatory view for explaining problems in the conventional display apparatus using the reflecting type hologram screen. That is, the reflecting type hologram screen 70' is used instead of the transmitting type hologram screen 70. The signal light from the irradiating unit 20 is reflected by the hologram 11 in an incident angle β and the reflected light is directed to the observer 60. In this case, since the first noise light (i.e., light 411, 412) and the second noise light 511 are not related to the diffraction of the hologram, there are the same problems as the transmitting type hologram screen as explained in FIG. 11.

The display apparatus according to the first embodiment of the first invention is explained in detail with reference to the attached drawings.

Figure 1:
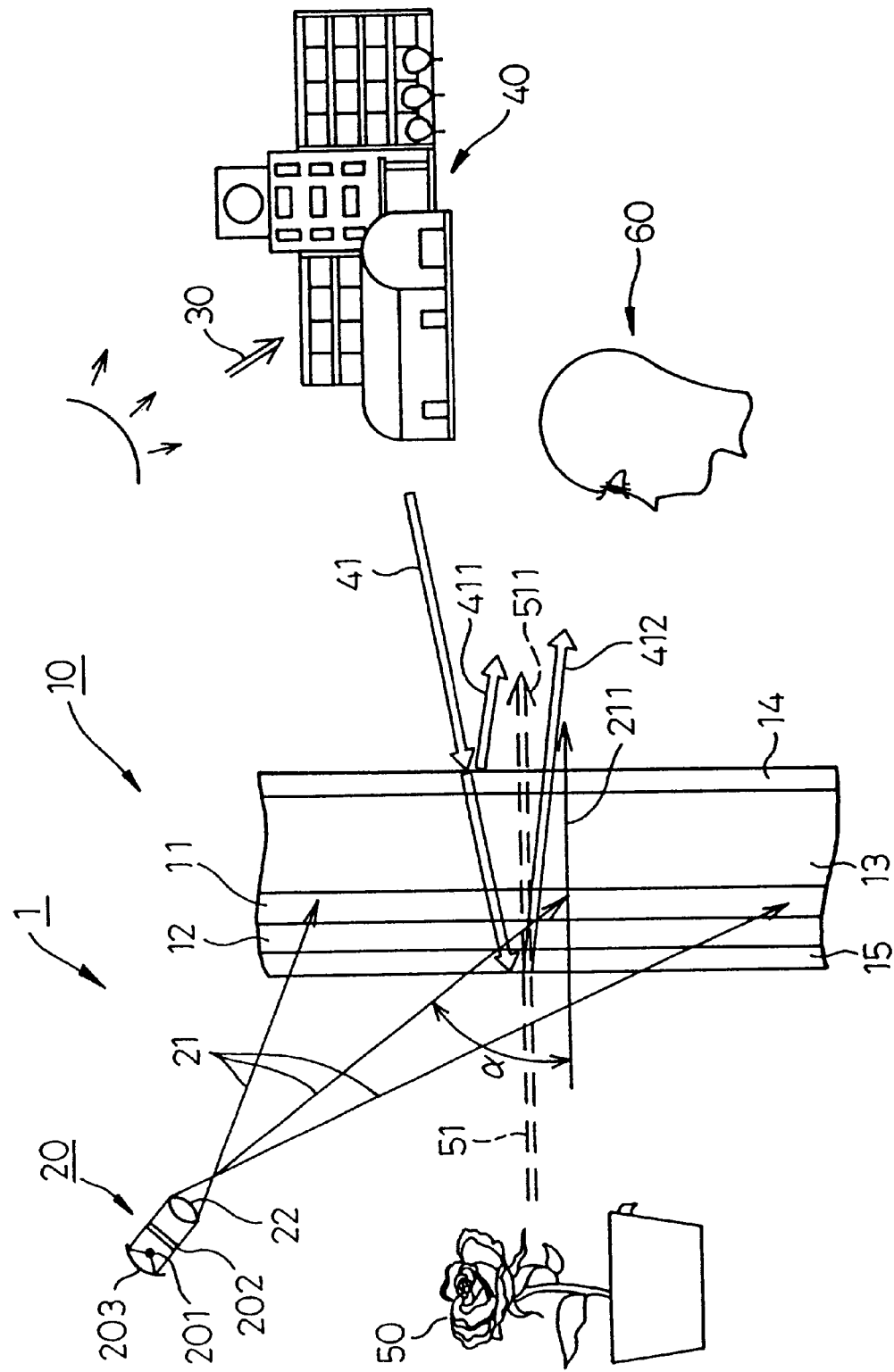
FIG. 1 shows an essential structure of a display apparatus according to the first embodiment of the first invention.

FIG. 1 shows an essential structure of a display apparatus according to the first embodiment of the first invention.

In FIG. 1, the display apparatus 1 includes an irradiating unit (i.e., projector) 20 and a hologram screen 10. The irradiating unit 20 emits the signal light 21 recorded the information to be displayed. The hologram screen 10 is formed by a transmitting type hologram 11, a cover film 12, a transparent substrate 13, and two reflection preventing members 14 and 15. In the hologram screen 10, the signal light 21 which is irradiated from the irradiating unit 20 in accordance with a predetermined incident angle α, is diffracted by the hologram 11 and transmitted to the observer 60.

As shown in FIG. 1, one reflection preventing member 14 is provided to the front side of the hologram screen 10, i.e., it is provided on the surface of the transparent board 13, and the other reflection preventing member 15 is provided to the rear side of the hologram screen 10, i.e., it is provided on the surface of the cover film 12. Both reflection preventing members 14 and are formed by reflection preventing films each having a luminous reflectance 0.8%.

The detailed structure of the display apparatus shown in FIG. 1 is explained below.

As shown in FIG. 1, the irradiating unit 20 includes a light source 201; a liquid crystal element 202 recorded the image; a reflector 203 for converting the diverged light, which is emitted from the light source 201, to the parallel light; and an image formatting lens 22.

In the hologram screen 10, as shown in FIG. 1, the hologram 11 is provided between the transparent substrate 13 and the cover film 12. Further, the reflection preventing members 14 and 15 are provided on the surface of the transparent board 13 (see number 14) and on the surface of the cover film 12 (see number 15).

The transmitting type hologram 11 is formed by the transparent member. In order to prevent the diffracted light at zero-order entering the observer's eyes, the signal light 21 is irradiated from the image formatting lens 22, which is provided to upper and slant direction, to the hologram 11. The irradiated signal light 21 is changed so as to direct to approximately horizontal direction in accordance with the diffraction (i.e., an incident angle α), and the diffracted signal light 211 is scattered so that the observer 60 can visually recognize the image displayed on the hologram screen 10. In this case, the incident angle α between the signal light 21 and the diffracted light 211 is approximately 30° to 40° in the center of the hologram screen 10.

Figure 2:
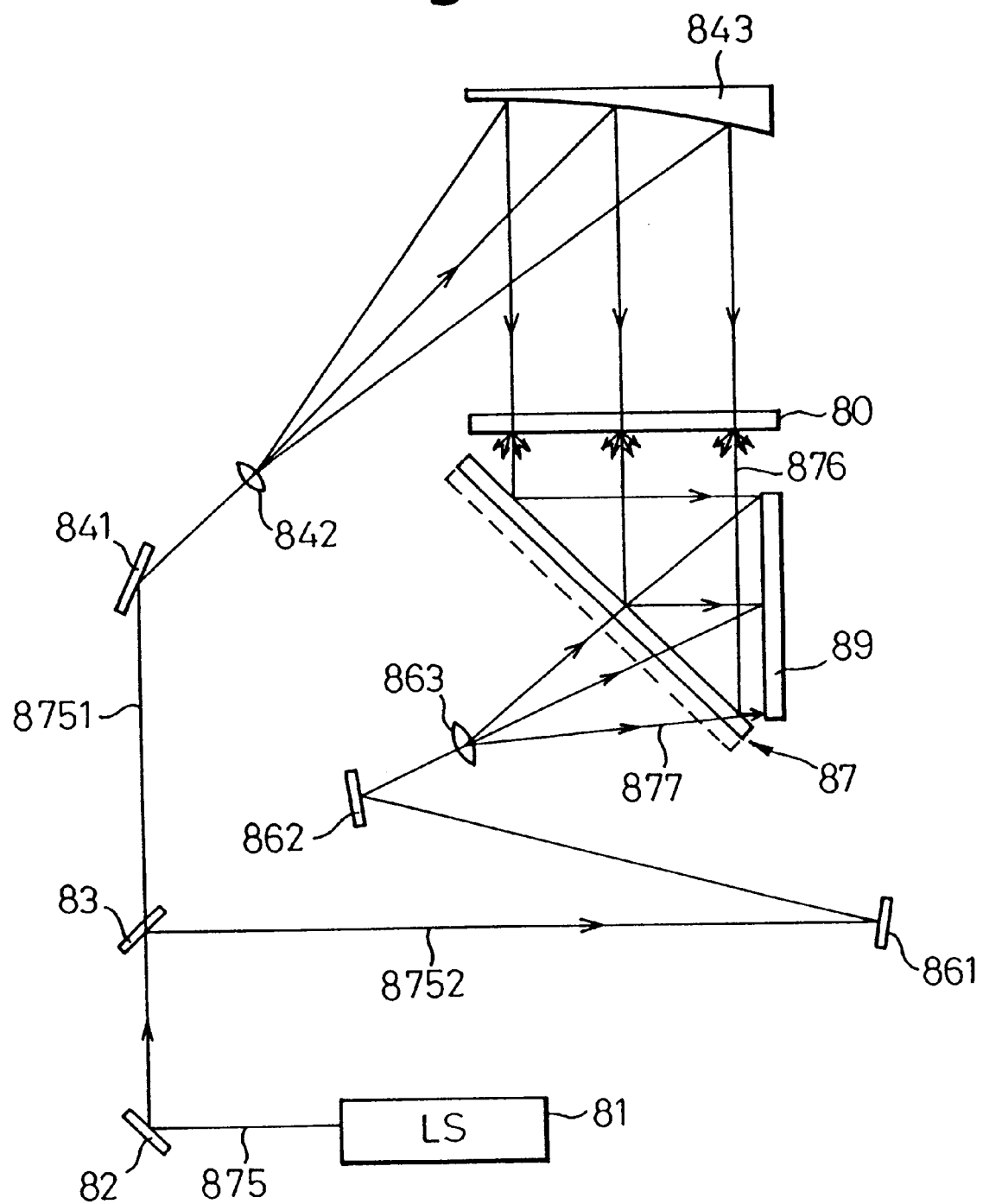
FIG. 2 shows an optical system for explaining an exposure process of the hologram shown in FIG. 1.

FIG. 2 shows an optical system for explaining an exposure process of the hologram shown in FIG. 1. In FIG. 2, reference number 81 denotes a laser source, 82 is a mirror, 83 is a half mirror, 841 is a mirror, 842 is a lens, 843 is an off-axis paraboloid, 80 is a non-transparent glass, 861 is a mirror, 862 is a mirror, 863 is a lens, 87 is a half mirror, 91 is a sensitive material, 876 is an object light, and 877 is a reference light.

The hologram 11 shown in FIG. 1 is formed by interference fringes which are provided by the optical system in this drawing. Gelatin dichromate is used as the sensitive material 89. The material to be recorded is the obscure glass 80 having a surface roughness of approximately #1000 (i.e., this surface roughness lies in the vicinity of wavelength of the irradiated light). In this case, it may be possible to use a photopolymer, a silver salt or a photoresist, as the sensitive material 89.

That is, the coherent light 875 which is emitted by the laser source 81, is reflected by the mirror 82. The light reflected by the mirror 82 is divided into two kinds of light paths in the half mirror 83. In this case, one light is called an object light 876, and the other is called a reference light 877.

The light 8751 from the half mirror 83 is transmitted to the off-axis paraboloid 843 through the mirror 841 and the object lens 842. In the off-axis paraboloid 843, the light 8751 is converted to the parallel light so as to form the object light 876 through the obscure glass 80 which is used as the diffusion plate. The object light 876 is input to the sensitive material 89 through the half mirror 87.

On the other hand, another light 8752 from the mirror 83 is transmitted to the object lens 863 through the mirror 861 and the mirror 862. The light 8752 is converted to the diverged light, i.e., the reference light, by the lens 863. The reference light 877 is input to the sensitive material 89 through the half mirror 87. As a result, it is possible to form a transmitting type hologram (see a hologram 11 in FIG. 1) recording the obscure glass 80 on the sensitive material 89.

Accordingly, in FIG. 1, when the reconstruction light is irradiated onto the hologram 11 from the direction of the reference light 877 (see FIG. 2), the diffracted light which is transmitted through the hologram 11 becomes the diffused light which is the same as the diffused light formed by the non-transparent glass 80 (see FIG. 2).

The diffraction efficiency of the hologram 11 is approximately 30% to 40%. Further, the so-called "half-value and half-angle" (i.e., the difference between an angle of the scattered light in which the intensity thereof becomes half and an angle of the scattered light in which the intensity thereof becomes maximum.) at the scattering of the diffraction light 211 is approximately 6°.

The normal image brightness of the hologram screen 10 is approximately 500 cd/m² when a size of the hologram screen 10 is 40 inches. This brightness is sufficiently high (i.e., bright) since the image brightness of a CRT display and a liquid crystal display are approximately 100 to 200 cd/m².

However, in the display apparatus according to this embodiment, it is necessary to discuss the contrast of the image which is influenced by the reflection on the hologram screen 10 of the background light at the observer's side and by the transmission of the background light at the rear side.

For example, when the display apparatus is used outside, the highest brightness of the background light at the observer's side is approximately 10000 cd/m² (if, for example, the background is a white wall of the building, or a white colored automobile.). On the other hand, the brightness of the background light at the rear side is approximately 50 cd/m², for example, in a normal room.

Accordingly, if no reflection preventing members 14 and 15 are provided to the hologram screen 10 (see FIG. 11), there are a reflection of 4% on the surface side of the hologram screen 10 and a reflection of 3.2% (=0.9×4×0.9) in the rear side of the hologram screen 10. As a result, there is a reflection of 7.2% in total. Accordingly, the reflected noise light "a" at the background sight 40 of the observer's side becomes 720 cd/m² which exceeds the normal image brightness (i.e., 500 cd/m² as mentioned above). In this case, the value 0.9 is the light-transmittance factor of the hologram screen 10. Further, the transmitted noise light "b" at the background sight 50 of the rear side is approximately 45 (=50×0.9) cd/M².

In this case, the contrast of the image is defined as follows.

(contrast of image)=[(normal image brightness) +a+b]/(a+b)

"a": brightness of reflected noise light at the background sight of the observer's side, and "b": brightness of transmitted noise light at the background sight of the rear side.

Accordingly, the contrast of the image is approximately 1.6 (i.e., (500+720+45)/(720+45)). In order to obtain a contrast of the image having good appearance, an evaluation experiment for appearance of the image was performed by five observers in such a way that the contrast of the image was adjusted by changing the brightness of the background at the observer's side and the brightness of the background at the rear side. A result of the experiment is shown in FIG. 13.

FIG. 13 is a graph for explaining the relationship between the appearance (ordinate) and the contrast of the image (abscissa). In the graph, A is a level at which the observer does notice the noise light; B is a level at which the observer starts to notice the noise light; C is a level at which the observer can see the noise light, but does not notice the noise; D is a level at which the noise light appears on the image; and E is a level at which no noise light appears on the image.

As shown in the graph, in order to obtain good appearance, it is necessary to set the contrast of the image so as to exceed 2 or more, and it is desirable to set the contrast so as to exceed 3 or more. Accordingly, if the reflection preventing members 14 and 15 according to the present invention are not provided on the hologram screen, it is very difficult to obtain good appearance because, as mentioned above, the contrast of the image is 1.6 in the conventional art.

FIG. 21 is a view for explaining the relationship between the reflection preventing film and the contrast of the image. In the drawing, (1) is the case where two reflection preventing films (i.e., the reflection preventing films) are provided to the front (observer's side) and rear sides, (2) is the case where one reflection preventing film (i.e., the reflection preventing film) is provided to only the front side (observer's side), and (3) is the case where no reflection preventing film are provided (i.e., in the case of the conventional art). As the conditions of the experiment, the image brightness is 500 cd/m$^2$, the brightness of the transmitted noise light (i.e., second noise) of the background at the rear side is 45 cd/m$^2$.

As is obvious from the drawing, in the case of (1), i.e., in the case of the present invention, it is possible to realize an image contrast of 3.7 and to sufficiently satisfy the levels C, D and E in FIG. 13. Further, it is possible to realize good appearance in the case of the image contrast 2.1, as is obvious from the graph of FIG. 13. In this case, although the case (1) is more advantageous than the case (2) from the viewpoint of quality of the image, the case (2) is more advantageous than the case (1) from the viewpoint of the cost of the hologram screen. On the other hand, in the case of (3), the image contrast is 1.6 and it is impossible to realize good appearance as explained above.

In the case of (1), i.e., in use of two reflection preventing films, in order to realize the image contrast 2 or more, it is necessary to satisfy the following formula (1). That is, $$\frac{10000 \times [r + r \times 0.9 \times 0.9] + 45}{500 + 10000 \times [r + r \times 0.9 \times 0.9] + 45} \geq 2 \qquad (1)$$

Where, "r" represents the reflection factor of the reflection preventing film (%)÷100.

From the formula (1), it is necessary to set the reflection factor of the reflection preventing film to the value 2.5% or less.

In the case of (2), i.e., in use of one reflection preventing film, in order to realize the contrast 2 or more, it is necessary to satisfy the following formula (2). That is, $$\frac{10000 \times [r + 4/100 \times 0.9 \times 0.9] + 45}{500 + 10000 \times [r + 4/100 \times 0.9 \times 0.9] + 45} \geq 2 \qquad (2)$$

Similarly, "r" represents the reflection factor of the reflection preventing film (%)÷100.

From the above formula (2), it is necessary to set the reflection factor of the reflection preventing film to the value 1.3% or less.

As another reflection preventing member, it is possible to utilize a transparent substrate, for example, a glass plate, an acrylic plate, a non-glare film, etc., which is deposited by the reflection preventing film. Further, it is possible to attach the reflection preventing film or to use the non-glare process to the transparent substrate 13 or the cover film 12.

In the above first embodiment, in the case of two reflection preventing members provided to both front and rear sides of the hologram screen 10, and in the case of one reflection preventing member provided to only front side of the hologram screen 10, the following explanations are given for the diffraction efficiency of the hologram and the reflection factor of the reflection preventing member for an amount of the light of the projector.

The image brightness of the hologram screen 10 can be expressed by the following formula.

$$L = [K \cdot \eta \cdot (Q/S)] / [\pi \cdot \pi (1 - \cos^2 \theta)] \qquad \ldots (3)$$

Where,

L: image brightness of hologram screen (cd/m$^2$)

η: diffraction efficiency of hologram (%)

Q: an amount of light of projector (lumen (lm)) Δθ: half-value & half-angle of hologram screen (degree)

S: a size of image of hologram screen (m$^2$)

K: constant (in the case of hologram screen, K=0.13 (constant)

The half-value & half-angle of the hologram screen is determined by the visual area on the hologram screen and it is required for approximately 6°.

Figure 3:
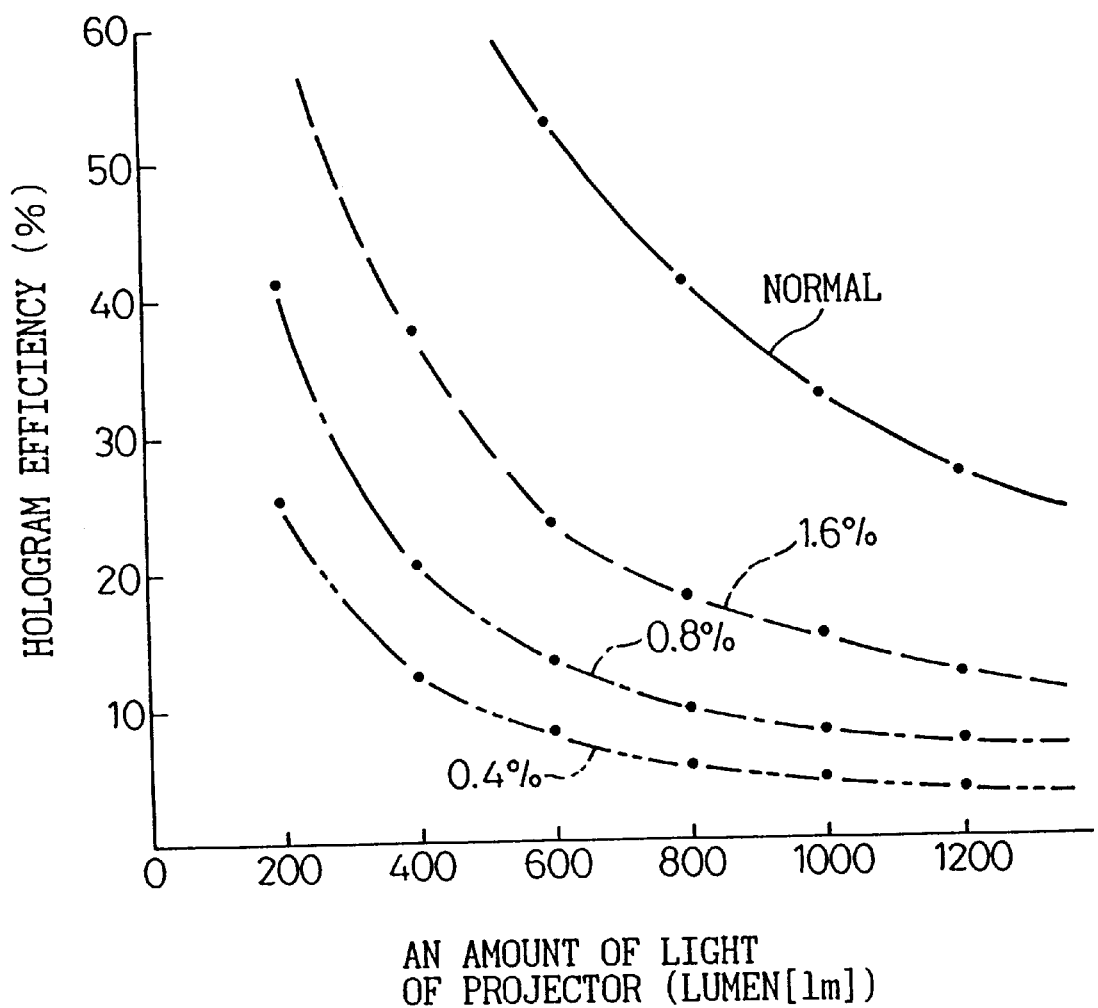
FIGS. 3 and 4 are graphs for explaining the relationship between diffraction efficiency of the hologram and light amount of the projector for each reflection factor.
Figure 4:
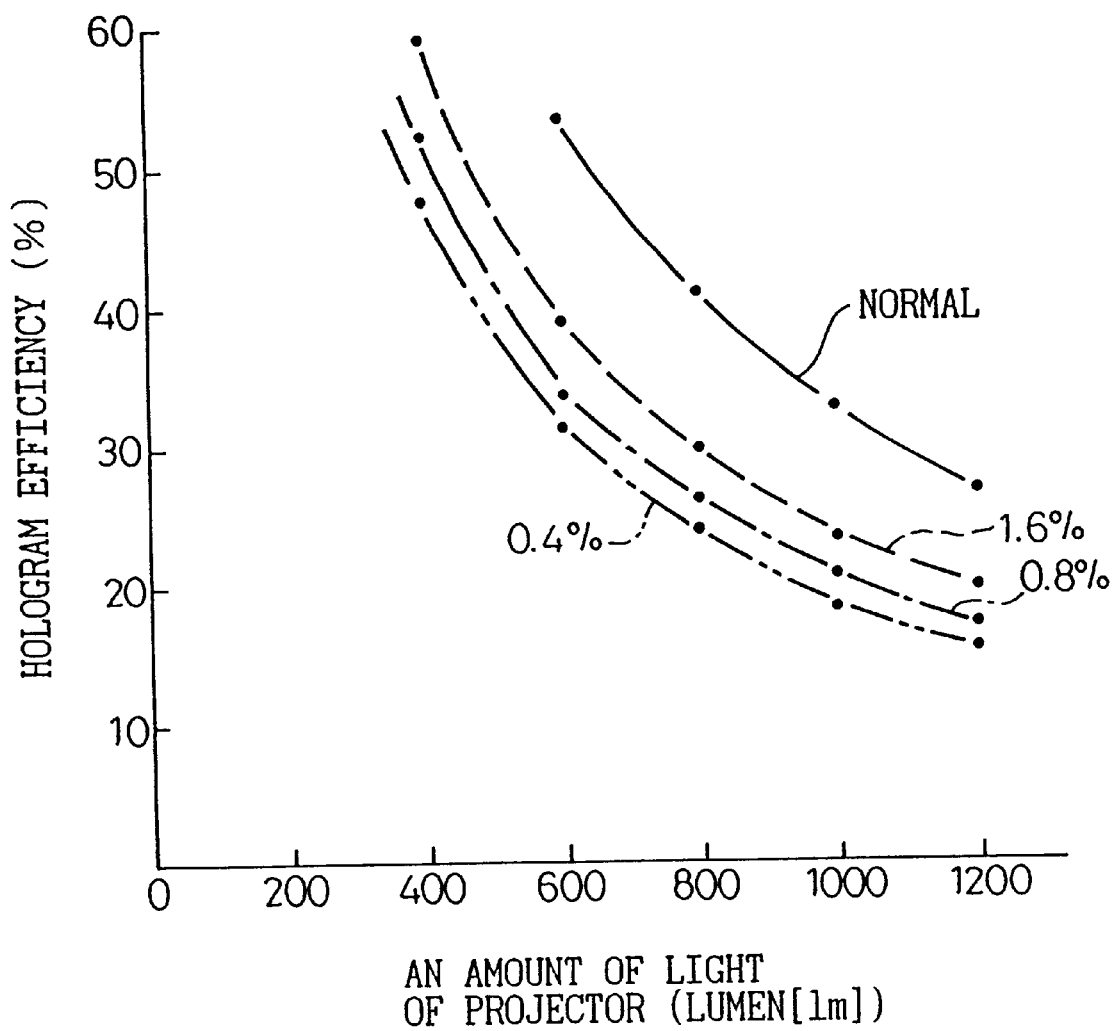

FIGS. 3 and 4 are graphs for explaining the relationship between the diffraction efficiency (see an ordinate) of the hologram and the light amount of the projector (see an abscissa) for each reflection factor. In this case, FIG. 3 is in the case of two reflection preventing members, and FIG. 4 is in the case of only one reflection preventing member. When the size of the image of the hologram screen is 40 inches (0.5 m$^2$), and when the image contrast due to the background light at the observer's side and the rear side is 2, the relationship between the diffraction efficiency (η) of the hologram and the amount of light of the projector (Q) can be expressed as shown in FIGS. 3 and 4.

As is obvious from the graph, when no reflection preventing member is provided to the hologram screen, it is necessary to set the diffraction efficiency of the hologram to 50% or more when the projector, for example, having the light amount 600 (lumen) is used. In this case, when reducing the reflection factor of the reflection preventing member, it is possible to also reduce the diffraction efficiency needed as minimum requirements of the hologram.

When two reflection preventing members are used in the front and rear sides, and when each reflection factor of the reflection preventing member is 0.4%, it is possible to set the image contrast to an allowable level (i.e., image contrast=2) when the diffraction efficiency of the hologram is approximately 8% or more.

On the other hand, when one reflection preventing member is used only in the front side, and when the reflection factor of the reflection preventing member is 0.4%, it is possible to set the image contrast to the allowable level.(i.e., image contrast=2) when the diffraction efficiency of the hologram is approximately 32% or more.

In this case, since a manufacturing cost of the reflection preventing member is dependent on the reflection factor, and since the reflection factor of the reflection preventing member is determined in accordance with the diffraction efficiency of the hologram and the projector to be used, it is possible to realize a low cost hologram screen in the present invention.

Further, when the brightness of the reflection noise at the background of the observer's side is Nr, and when the transmittance brightness at the background of the rear side is Nt, the diffraction efficiency of the hologram and the light amount of the projector, which are required in order to achieve the target contrast of the image, can be expressed as follows.

When the image contrast is 2, the formula is as follows.

$$\eta \cdot Q > (Nr+Nt) \cdot ((\pi \cdot \pi (1-\cos^2\theta)) \cdot S)/K \quad \ldots (4)$$

When the image contrast is 3, the formula is as follows.

$$\eta \cdot Q > 2(Nr+Nt) \cdot ((\pi \cdot \pi (1-\cos^2\theta)) \cdot S)/K \quad \ldots (5)$$

It is possible to determine the necessary light amount of the projector and the diffraction efficiency of the hologram for the image contrast based on the above two formulas (4) and (5).

Figure 5:
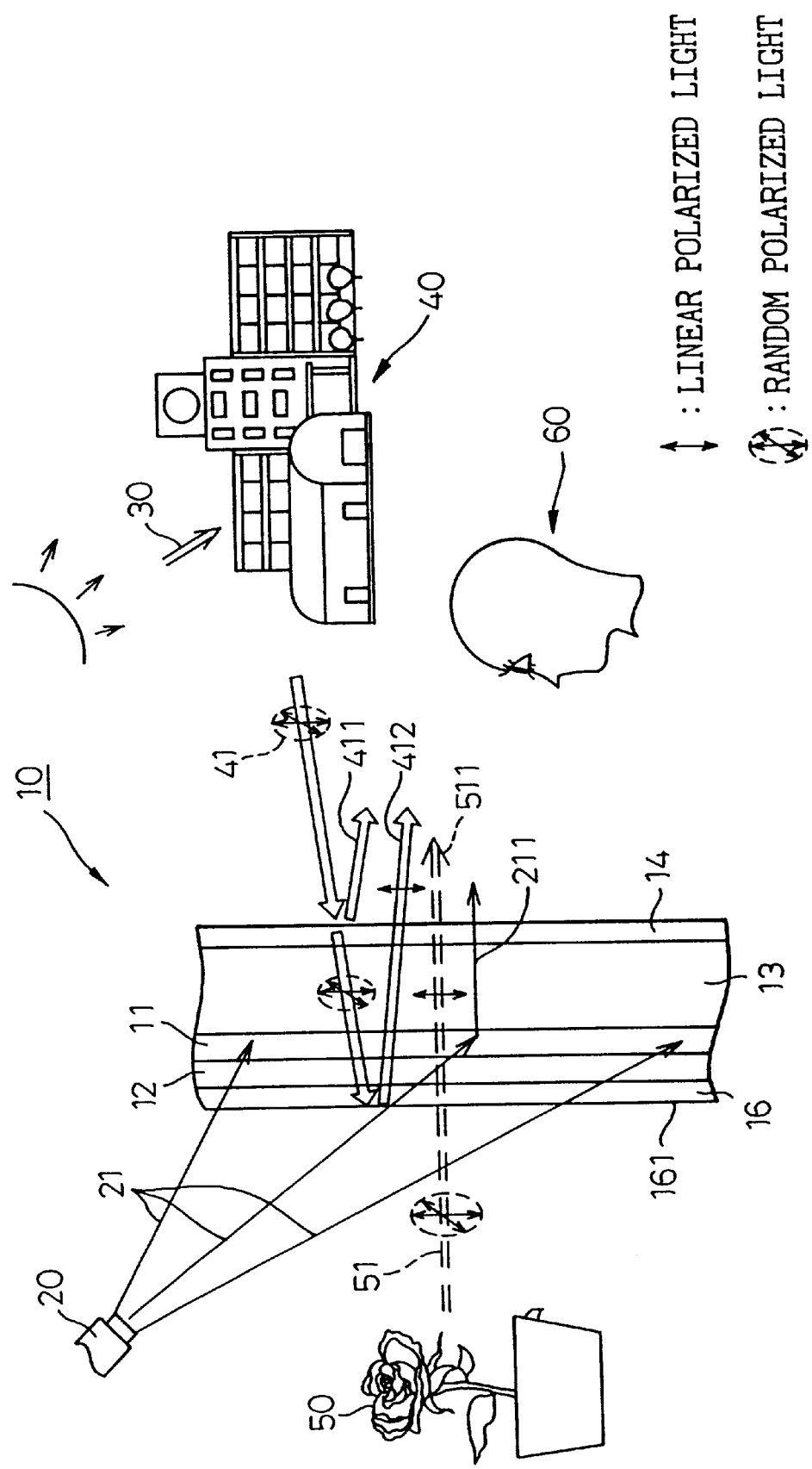
FIG. 5 shows an essential structure of the display apparatus according to the second embodiment of the first invention.

FIG. 5 shows an essential structure of a display apparatus according to the second embodiment of the first invention.

In FIG. 5, the same reference numbers used in FIG. 1 are attached to the same components in this drawing. As is obvious from the drawing, the reflection preventing member 14 is provided to the front side of the hologram (i.e., an observer's side) and a polarization optical element 16 is provided to the rear side (i.e., a side of the projector) instead of another reflection preventing member 15.

In this embodiment, a polarization film or polarization plate was used as the polarization optical element 16. Further, it is possible to eliminate the cover film 12 when the polarization optical element 16 can be used as both polarization elements and cover film. The light-transmittance factor 60% for random light is used for the polarization film or the polarization plate. Reference number 161 denotes the surface of the polarization optical element 16.

The reflection preventing member 14 can reduce the reflection noise 411 at the front side of the hologram screen (i.e., input from the background of the observer's side), and the polarized optical element 16 can reduce the second noise input from the background of the rear side to approximately one sixth or one seventh. Further, since the signal light (i.e., the linear polarized light) orthogonally cross to the absorption axis of the polarized optical element, it is possible to transmit almost all the signal light so that it is possible to raise the image contrast to the second noise by several times.

Further, the polarized optical element 16 can reduce the reflected light 412 of the rear side of the hologram screen at the background of the observer's side. That is, the light 41 from the background at the observer's side is the random polarized light. Although the random polarized light 41 is reflected by the front side of the hologram screen 10, almost all the random polarized light is directed to the internal portion of the hologram screen 10 and transmitted through the hologram 11. When the random polarized light is transmitted through the polarized optical element, the intensity of the light is attenuated to approximately one sixth or one seventh. Accordingly, the noise light 412 reflected at the rear side 161 of the polarized optical element can be reduced to approximately one sixth or one seventh.

Accordingly, the first noise caused by the background of the observer's side and the second noise caused by the background of the rear side can be reduced so that it is possible to considerably raise the image contrast in the first and second noises, as shown by numbers 411, 422 and 511.

Figure 6:
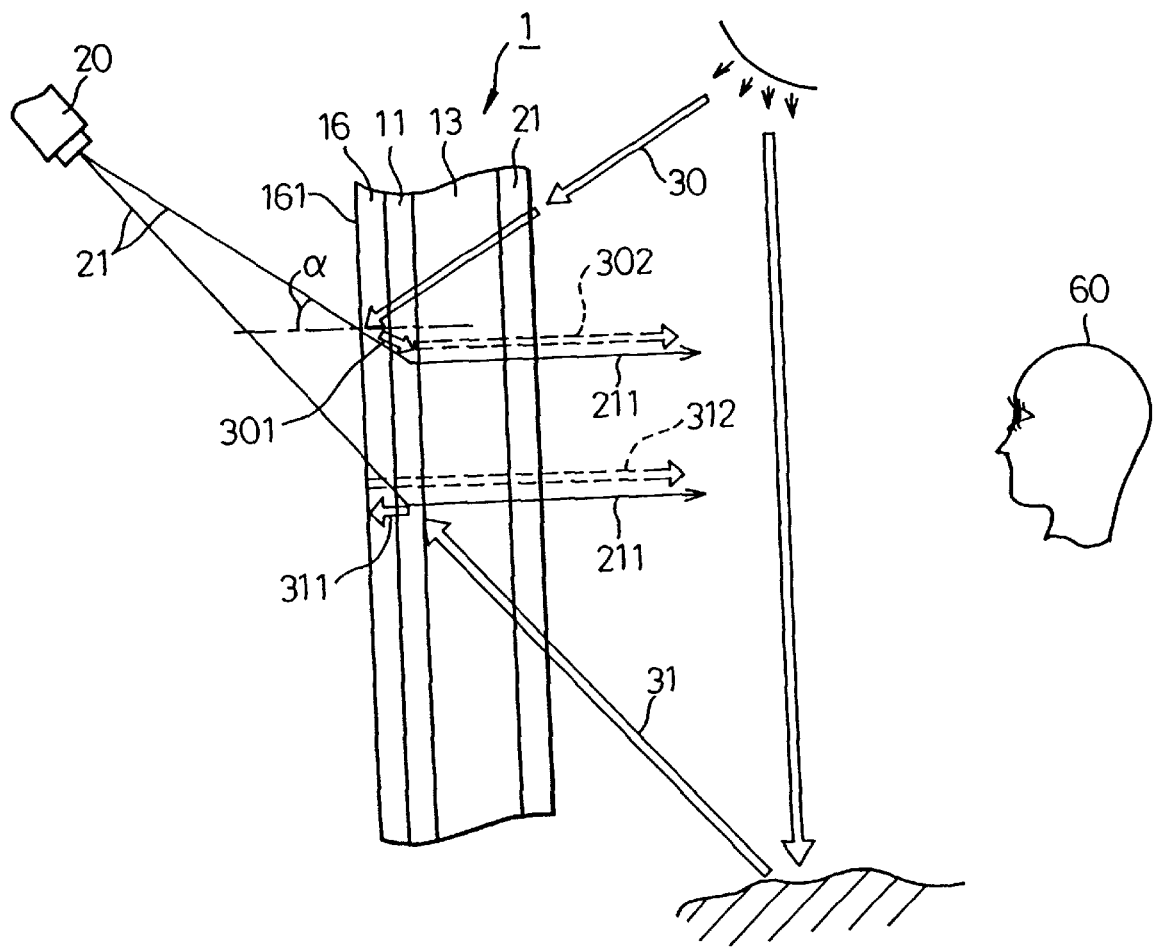
FIG. 6 is an explanatory view in the case of outside use of the first invention.

FIG. 6 is an explanatory view in the case of outside use of the first invention. The first invention can solve in both cases, i.e., in the case that the background 40 at the observer's side is bright, and in the case that the background 50 at the rear side of the hologram screen 10 is bright. For example, even if the hologram screen 10 is used outside, and if the rear side of the hologram screen 10 is a bright room, it is possible to raise the image contrast in the present invention.

Since the polarized optical element is provided to the rear side of the hologram screen, the regularly reflected light 301 at the outside surface 161 is transmitted and diffracted toward the observer 60 with high efficiency so that this light becomes the third noise light 302. Further, the light 31 is reflected by the hologram 11, and the transmitted and diffracted light 311 becomes the fourth noise 312 after reflection toward the observer 60.

Regarding the third noise light 302, the light 30 is input to the hologram screen 10 and regularly reflected by the surface 161 of the polarized optical element 16 so that it is possible to reduce the noise light 302 to one sixth or one seventh within the polarized optical element 16.

Regarding the fourth noise light 312, the light is diffracted and transmitted by the hologram 11, and reflected by the surface 161 of the polarized optical element 16 so that it is possible to reduce the noise light 312 to one sixth or seventh within the polarized optical element 16.

As explained in detail below, a half-transparent or a non-transparent optical material and the polarized optical element are very effective for reduction of the third and fourth noises.

Further, as explained in detail below, a non-glare optical material or a non-glare type reflection preventing member is also very effective for reduction of the third and fourth noises.

Figure 7:
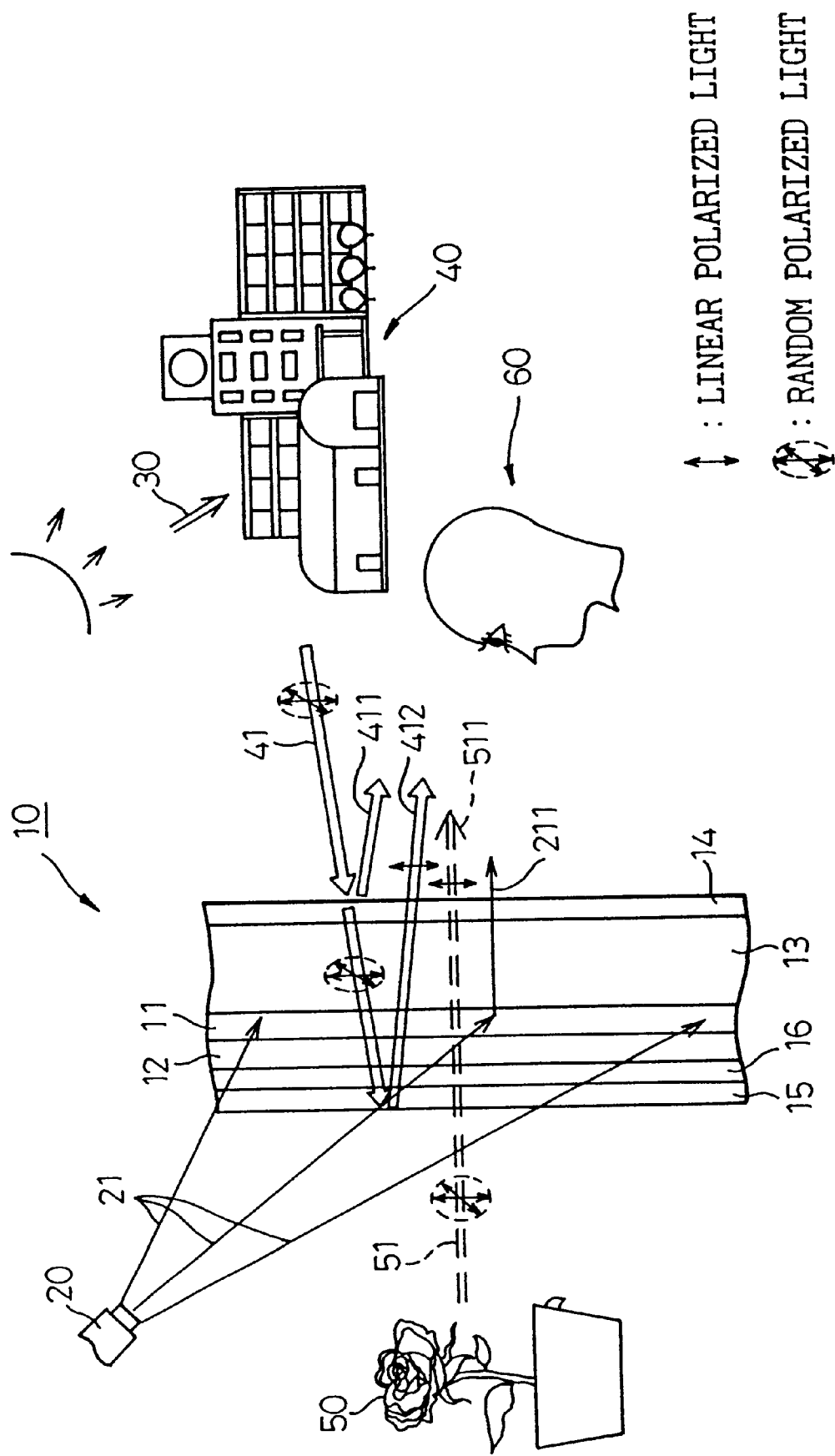
FIG. 7 shows an essential structure of the display apparatus according to the third embodiment of the first invention.

FIG. 7 shows an essential structure of a display apparatus according to the third embodiment of the first invention. In FIG. 7, the same reference numbers used in FIG. 5 are attached to the same components in this drawing. As is obvious from the drawing, the polarization optical element 16 is provided to the rear side (i.e., a side of the projector), i.e., between the cover film 12 and the reflection preventing film 15. In this case, the reflection preventing film having the luminous reflection factor 0.8% is used for the reflection preventing members 14 and 15. Other components are the same as the first embodiment.

In the third embodiment, the maximum brightness at the background 40 of the observer's side is approximately 10000 cd/m², and the maximum brightness at the background 50 of the rear side is approximately 200 cd/m². In FIG. 7, the light 51 is the random polarization light from the background 50, and the light 511 is the linear polarization light after the random polarization light has passed through the hologram screen 10. The reflection noise light 412 can be considerably reduced by the hologram screen 10 so that it is possible to raise the contrast of the image.

FIG. 22 is a view for explaining the relationship between the reflection preventing film or polarized optical element and the image contrast. In the drawing, the front side is the observer's side. (1) is in the case that both reflection preventing film and polarized optical film are provided, (2) is in the case of the second embodiment (see FIG. 5), and (3) is in the case of the third embodiment (see FIG. 7). In this case, the image contrast is defined by the reflected noise light due to the background 40 at the observer's side and the noise light due to the light-transmittance of the background 50 at the rear side.

As is obvious from the drawing, the image contrast is 1.6 in the case of (1), the image contrast is 2.6 in the case of (2) and the image contrast is 3.4 in the case of (3). Accordingly, it is possible to realize high image contrast in the case of (2) and (3), i.e., in the case of the second and third embodiment. In the drawing, the maximum brightness at the background of the observer's side is set to 10000 cd/m$^2$, and the maximum brightness at the background of the rear side is set to 200 cd/m$^2$.

When the reflection preventing film having the reflection factor 2.5% is used as the reflection preventing member at the front side (i.e., the observer's side) as shown in the second embodiment, it is required to satisfy the following formula (6) in order to realize the image contrast 2 or more.

$$\frac{500 + 10000 \times [0.025 + 4 \times t^2 \times 0.9 \times 0.9] + 200t}{10000 \times [0.025 + 4 \times t^2 \times 0.9 \times 0.9] + 200t} \geq 2 \quad (6)$$

Where, "t" is defined by the light-transmittance (%) of the polarization optical member÷100. The light-transmittance of the polarization which satisfies the formula (6) is 65% or less.

As mentioned above, the preferable light-transmittance of the polarized optical element is 65% or less. If the light-transmittance exceeds 65%, the image contrast becomes worse and appearance of the image also becomes worse. The preferable lower limit of the light-transmittance is 20%.

Figure 8:
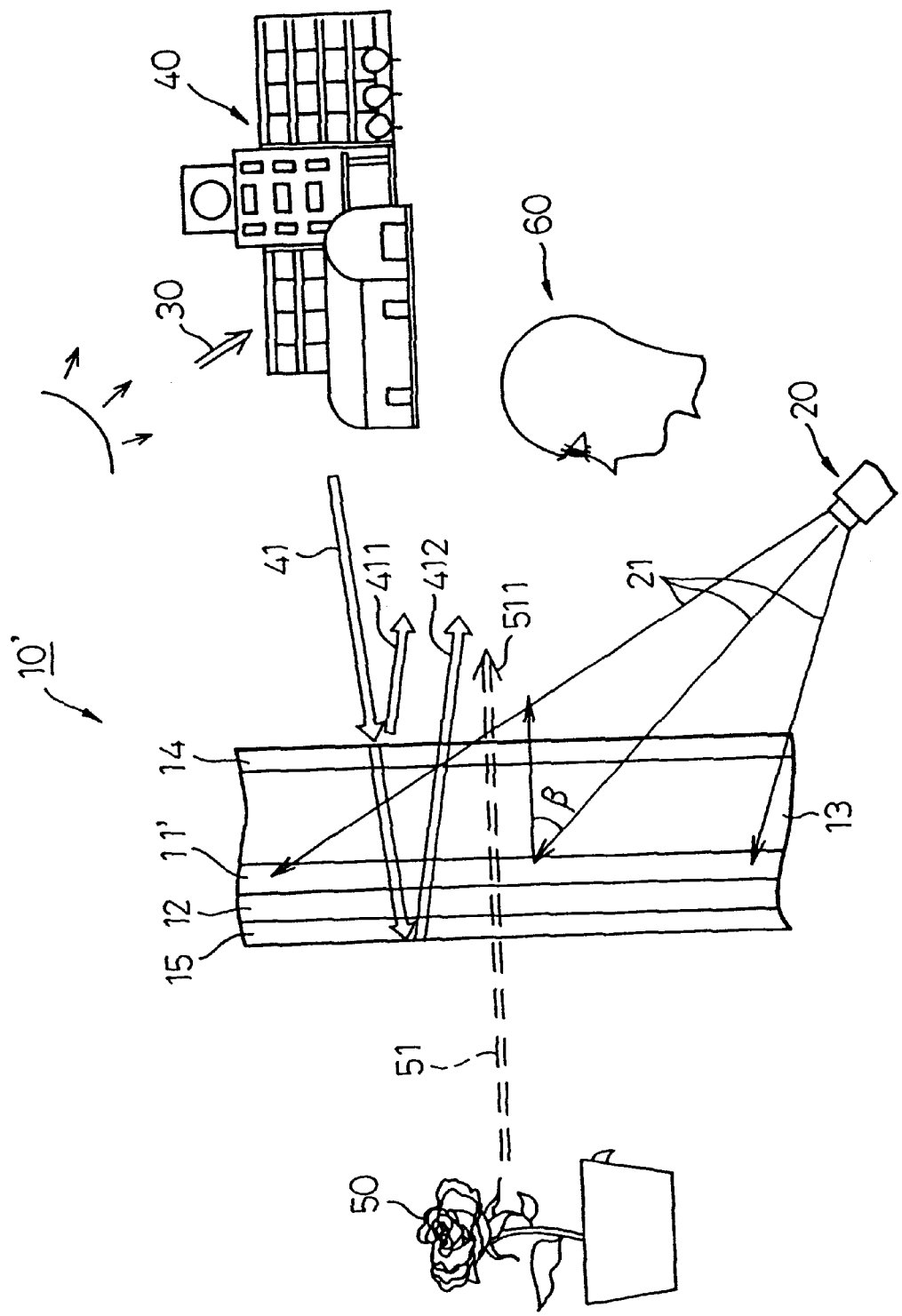
FIG. 8 shows an essential structure of the display apparatus according to the fourth embodiment of the first invention.

FIG. 8 shows an essential structure of a display apparatus according to the fourth embodiment of the first invention. In FIG. 8, the same reference numbers used in FIG. 1 are attached to the same components in this drawing. As is obvious from the drawing, the structure of this embodiment is the same as the first embodiment. In this embodiment, however, a reflecting type hologram 11' is provided instead of the transmitting type hologram. That is, the display apparatus 1 according to the fourth embodiment includes the reflecting type hologram screen 10' having the reflecting type hologram 11' and two reflection preventing members 14 and 15 which are provided to the front and rear sides of the reflecting type hologram screen 10'. The same effect as the first embodiment can be provided for the reflection at the front and rear sides of the reflecting type hologram screen 10' at the background of the observer's side. The signal light 21 from the irradiating unit 20 is reflected by the hologram 11' in the incident angle β and the reflected light is directed to the observer 60.

The reflected light 411 and 412 (i.e., noise light) input from the background 40 and reflected by each surface of the reflecting type hologram screen 10' can be considerably reduced by either one side of the reflection preventing member or both side of the reflection preventing members 14 and 15.

Figure 9:
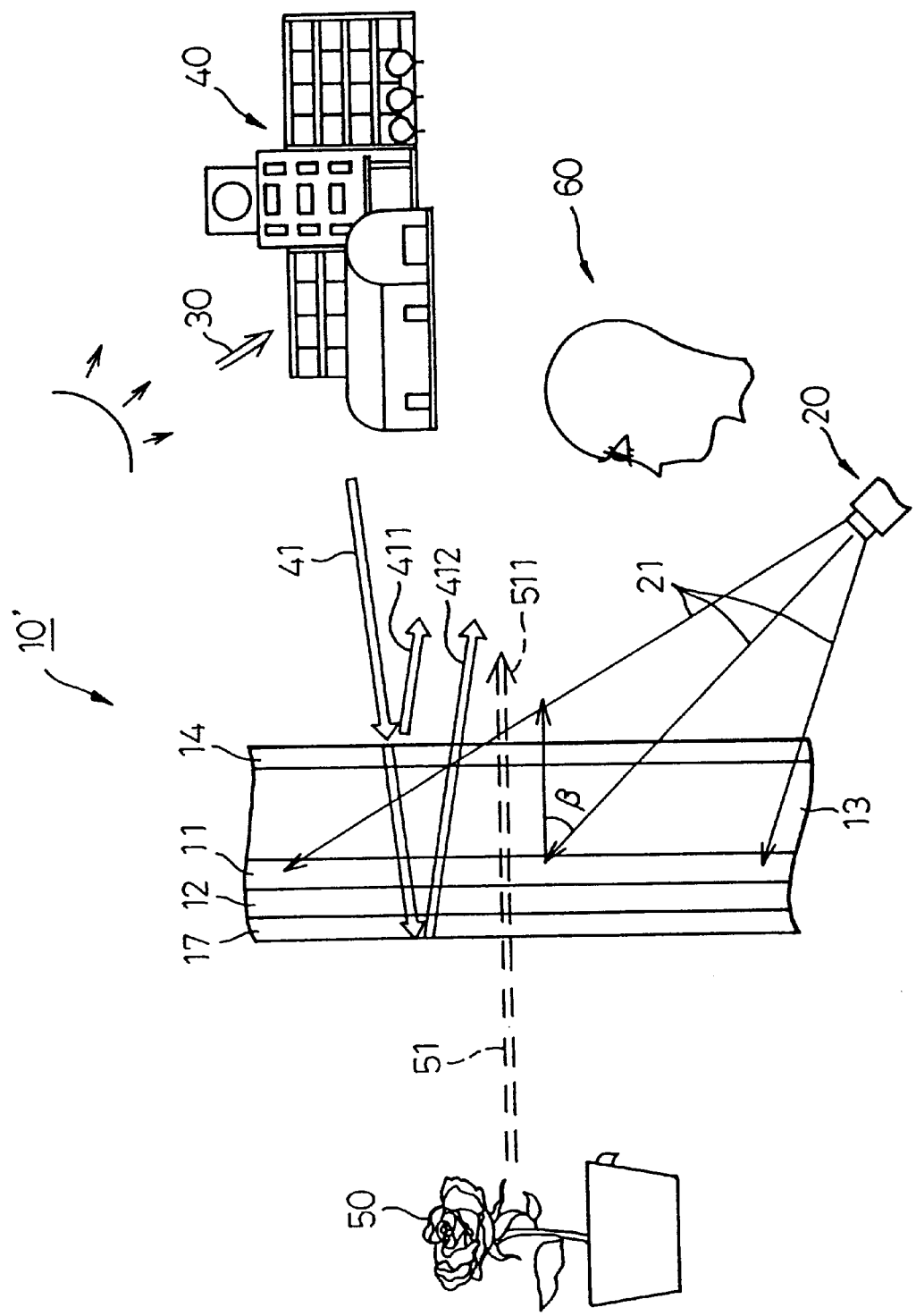
FIG. 9 shows an essential structure of the display apparatus according to the fifth embodiment of the first invention.

FIG. 9 shows an essential structure of a display apparatus according to the fifth embodiment of the first invention. In FIG. 9, the same reference numbers used in FIG. 8 are attached to the same components in this drawing. As is obvious from the drawing, in this embodiment, a half-transparent or a non-transparent optical member 17 is provided to the rear side of the reflecting type hologram screen 10' instead of the reflection preventing member 15 of FIG. 8.

In this embodiment, a smoked film was used as the half-transparent or non-transparent optical member 17. Further, it may be possible to use the polarization optical member instead of the half-transparent or non-transparent optical member 17. Still further, it may be possible to use the half-transparent or non-transparent substrate, or a colored substrate, instead of the transparent substrate. Other components are the same as the fourth embodiment.

The reflected light 411 and transmitted light 511 (i.e., noise light) from the reflecting type hologram screen 10' can be attenuated by the half-transparent or non-transparent optical material to one sixth or one seventh. Accordingly, the noise light 412 also can be attenuated by the second power of one sixth or one seventh. Further, when the light-transmittance of the half-transparent optical material becomes smaller, it is possible to reduce the noise light 412.

FIG. 23 is a view for explaining the relationship between the light-transmittance and the image contrast. In the drawing, the front side is the observer's side. (1) to (4) represent the light-transmittances of the half transmittance optical material. (1) is in the case of the light-transmittance 80%, (2) is in the case of the light-transmittance 60%, (3) is in the case of the light-transmittance 40% and (4) is in the case of the light-transmittance 0% (i.e., a non-transparent material). As is obvious from the drawing, the image contrast is 2.0 when the light-transmittance is 80% and the highest image contrast is 4.1 when the light-transmittance is 0%. Accordingly, the lower light-transmittance is, the higher image contrast can be obtained.

Figure 10:
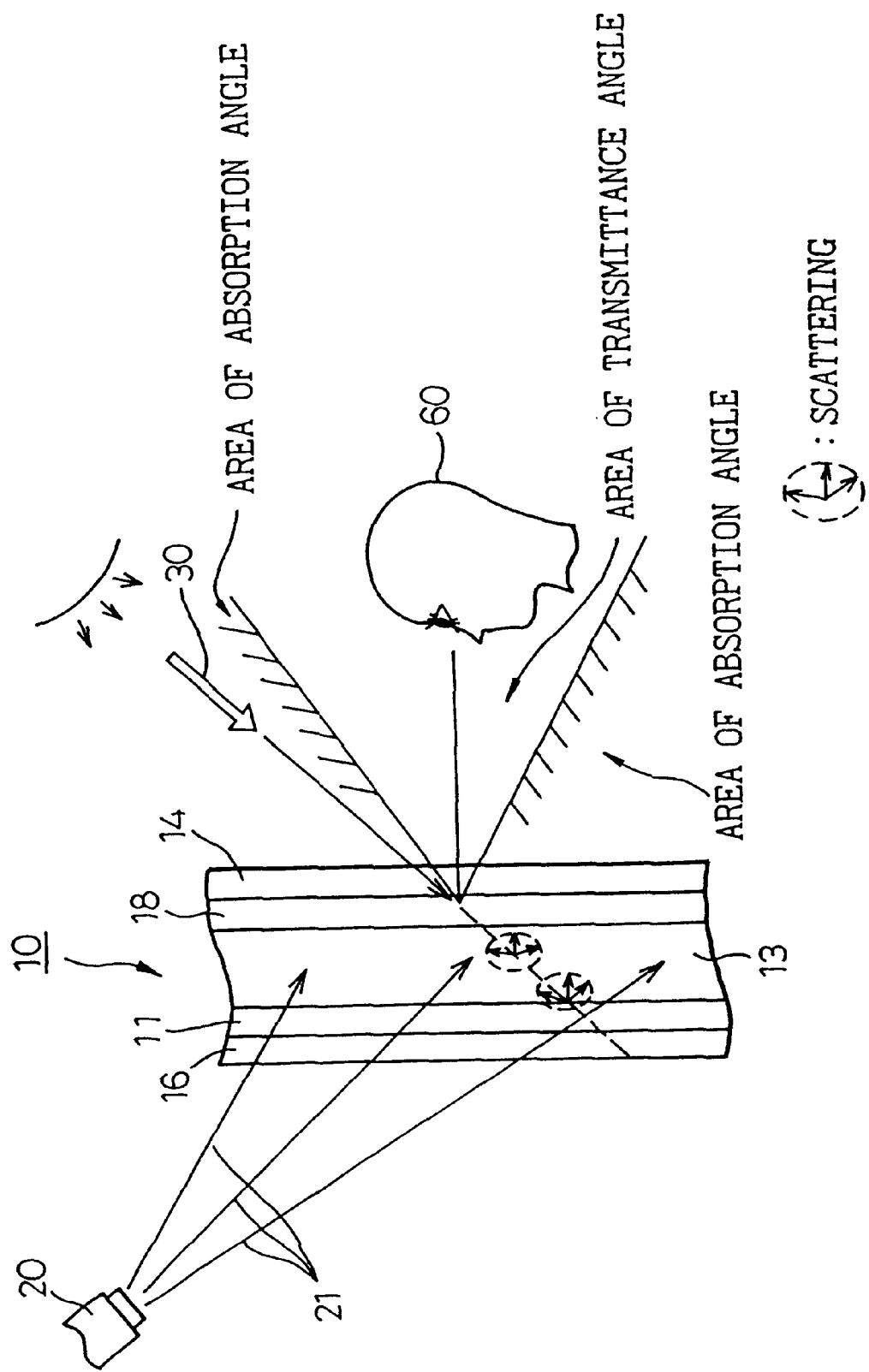
FIG. 10 shows one concrete example of the first invention applied to a vehicle.

FIG. 10 shows one example of the first invention applied to a vehicle. In this case, the hologram screen 10 is the transmitting type. When the first invention is applied to the display apparatus used in the vehicle, it is possible to achieve the same effect as the above embodiments. In the drawing, reference number 18 is a louver film provided to windows of the vehicle, 14 is the reflection preventing member, and 16 is the polarization optical element.

Figure 14C:
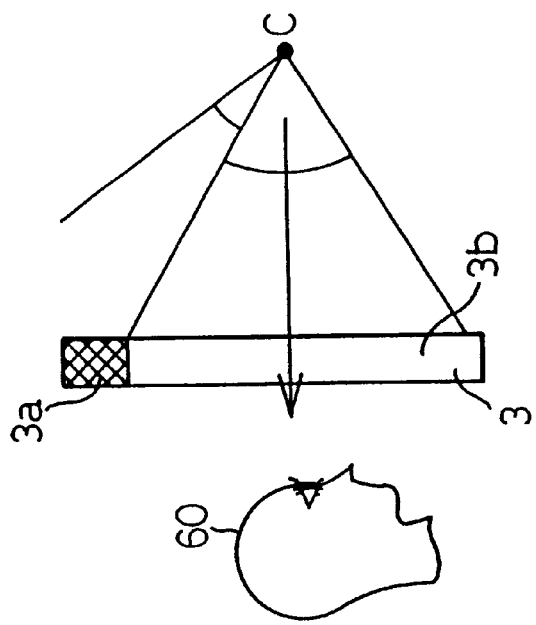
FIGS. 14A, 14B and 14C show essential structures of the display apparatus according to the sixth embodiment of the first invention.
Figure 14B:
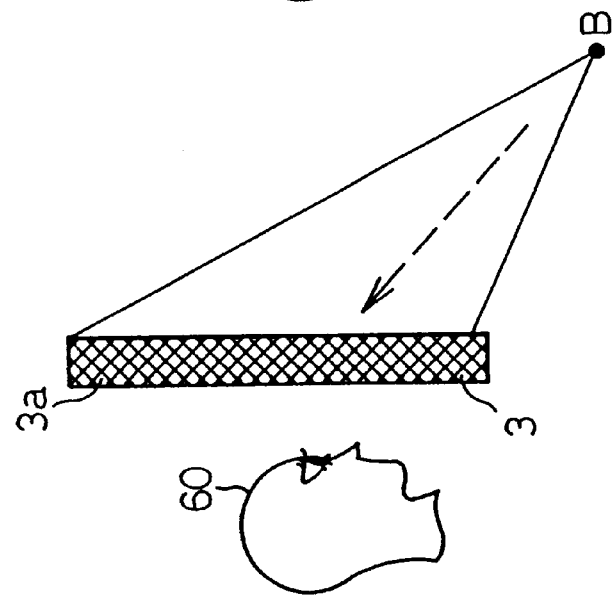
Figure 14A:
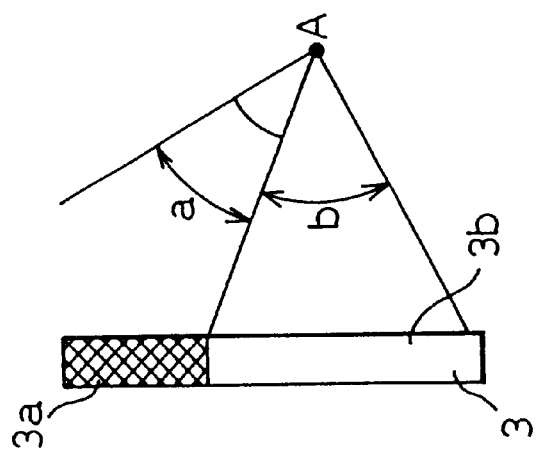

FIGS. 14A, 14B and 14C show essential structures of a display apparatus according to the sixth embodiment of the first invention. In these drawings, reference number 3 denotes a screen which is formed of a transparent substrate having a viewfield selecting function. For example, model "ANGLE 21" made by Nippon Sheet Glass Co., Ltd. (Nippon Itagarasu), or model "LUMISTY" made by SUMITOMO CHEMICAL CO., LTD. (Sumitomo Kagaku Kogyo) is closely attached to the transparent substrate. Further, reference number 3a denotes a non-transparent viewfield area on the screen 3, and reference number 3b denotes a transparent viewfield area on the screen 3.

As shown in FIG. 14A, the transparent viewfield area 3b exists in the viewfield range of an angle "b" from a point A, and the non-transparent viewfield area 3a exists in the viewfield range of an angle "a" from the viewpoint A.

In this case, it is possible to recognize a subject from the viewpoint A through the screen 3 in the range of the angle "b", but it is impossible to recognize the subject from the viewpoint A through the screen 3 in the range of the angle "a".

Accordingly, as shown in FIG. 14B, when the viewpoint is provided to the lower position as shown by the viewpoint B, the whole of the screen 3 is changed to the non-transparent viewfield area 3a so that it is impossible to see the subject (i.e., the observer 60). On the other hand, as shown in FIG. 14C, when the viewpoint is provided to the center of the screen 3 as shown by the viewpoint C, it is possible to see the subject (i.e., the observer 60) through the screen 3 since almost all area of the screen 3 is changed to the transparent viewfield area 3b.

As is obvious from the above, when the screen 3 is employed in this embodiment, the irradiation unit is provided to the position of the viewpoint B. In this case, the signal light emitted from the irradiation unit is scattered by the screen 3 so that the observer 60 can see the image on the screen 3. Further, the screen 3 can be utilized for the display apparatus having both transmitting and reflecting type hologram.

As shown in FIG. 14C, however, since the viewpoint C can be observed by the observer 60 through the screen 3, the observer 60 also observes the noise light at the background of the rear side of the display apparatus as well as the case of the hologram screen. Further, since there is the difference in refractive index on the boundary surface between the screen 3 and the air so that the surface reflection occurs on the boundary surface. Accordingly, the noise light at the background of the observer's side occurs as well as the hologram screen.

In the above case, how to reduce the noise light at the background of the observer's side and the rear side can be realized by the same methods as mentioned in the first to fifth embodiments.

Still further, although the detailed explanations will be given in the second invention hereinafter, if the irradiation unit 110 is provided to the position of the viewpoint B, and if the image input unit 120 is provided to the viewpoint C, the observer 60 can see the image on the screen 3 and the image input unit 120 can take the image of the observer 60 through the screen 3.

Figure 15:
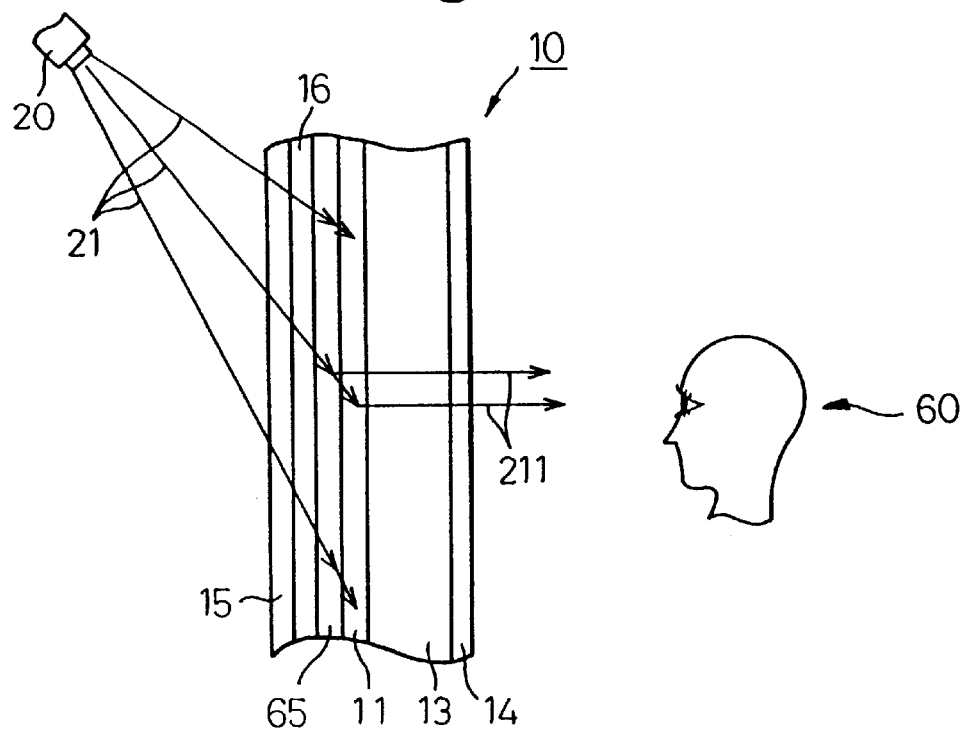
FIG. 15 shows a concrete example of the sixth embodiment according to the first invention.

FIG. 15 shows a concrete example of the sixth embodiment according to the first invention. As mentioned in the first to fifth embodiments, reference number 11 is the hologram, 13 is the transparent substrate, 14 and 15 are reflection preventing members, 16 is the polarization optical element, 20 is the irradiating unit, and 21 is the signal light. As shown in the drawing, the hologram 11 and the screen 65 used in the sixth embodiment are laminated in the hologram screen 10.

When the screen 65 is provided, the scattering and diffraction intensity of the signal light from the irradiating unit 20 can be increased so that it is possible to improve the brightness of the image and to apply good appearance to the observer 60. In this embodiment, the model "LUMISTY" made by SUMITOMO CHEMICAL CO., LTD. was used as the screen 65. In this case, since the "LUMISTY" is formed of film-like material, it is not closely attached to the transparent substrate 13.

Figure 16:
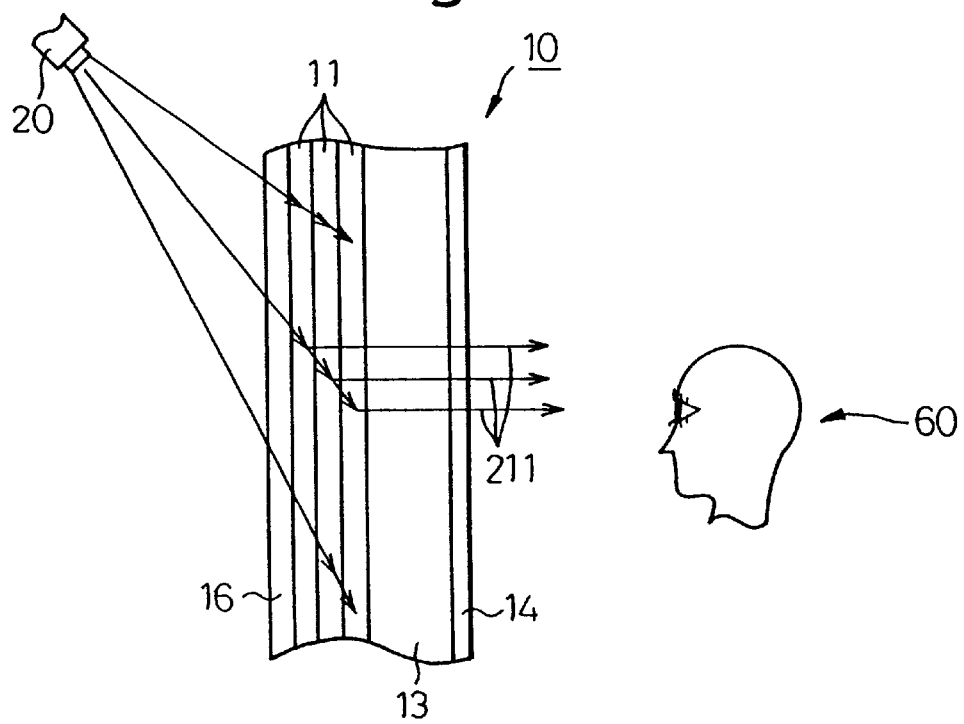
FIG. 16 shows another concrete example in the first to sixth embodiments according to the first invention.

FIG. 16 shows another concrete example in the first to sixth embodiments according to the first invention. In this case, a plurality of holograms 11 are laminated in the hologram screen 10, and it is possible to improve the brightness of the image and to provide good appearance to the observer 60.

Figure 17:
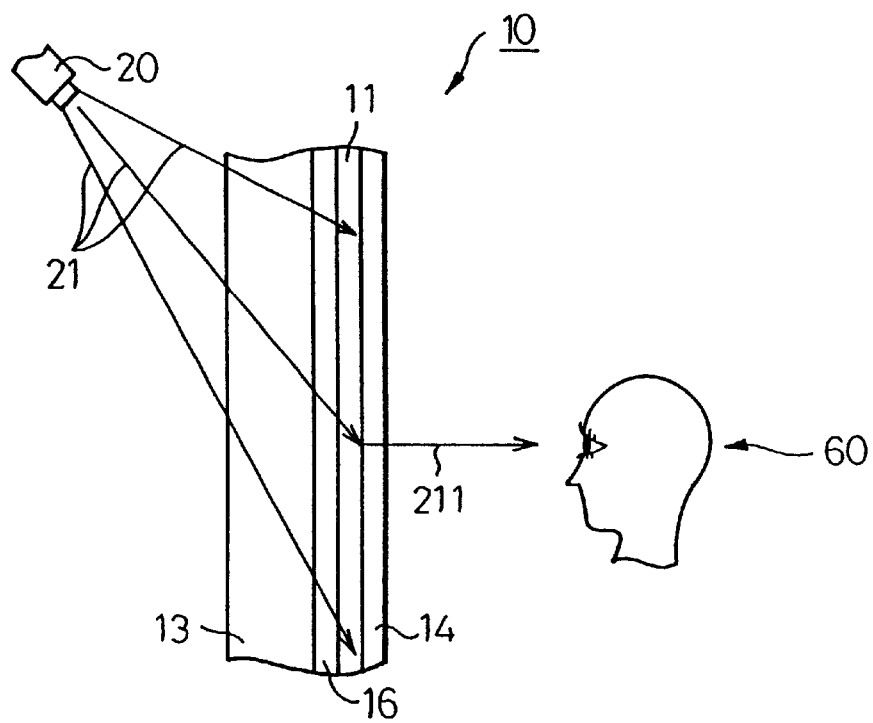
FIG. 17 shows still another concrete example in the first to sixth embodiments according to the first invention.

FIG. 17 shows still another concrete example in the first to sixth embodiments according to the first invention. As shown in the drawing, the hologram 11 and the polarization optical film 16 are provided between the reflection preventing member 14 and the transparent substrate 13 at the observer's side. In this example, it is also possible to improve the brightness of the image and to apply good appearance to the observer 60.

Figure 18:
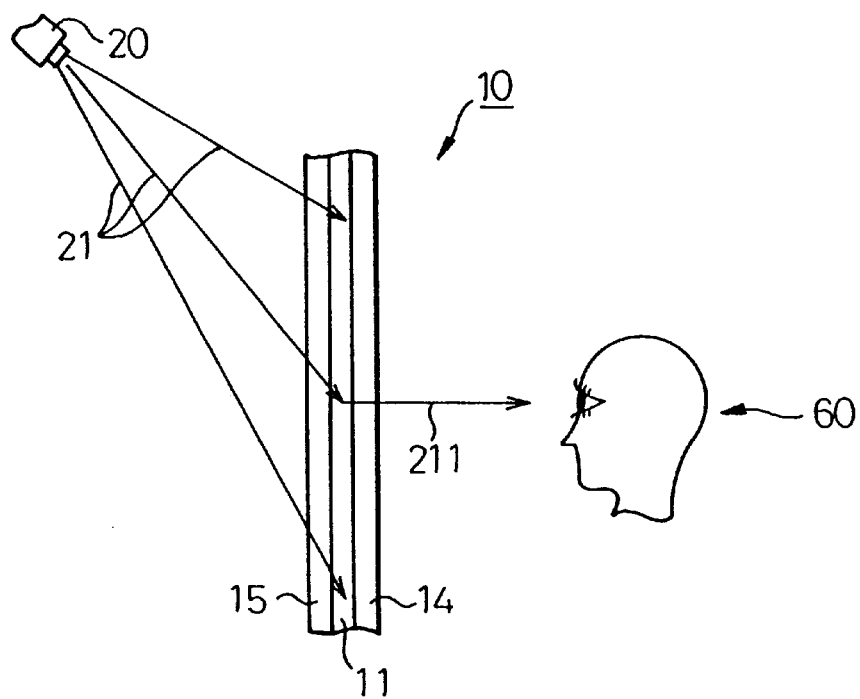
FIG. 18 shows still further concrete example in the first to sixth embodiments according to the first invention.

FIG. 18 shows still another concrete example in the first to sixth embodiments according to the first invention. As shown in the drawing, the transparent substrate 13 is eliminated, and the hologram 11 (for example, LUMISTY) is provided between the reflection preventing members 14 and 15. In this example, it is also possible to improve the brightness of the image and to apply good appearance to the observer 60.

Figure 19:
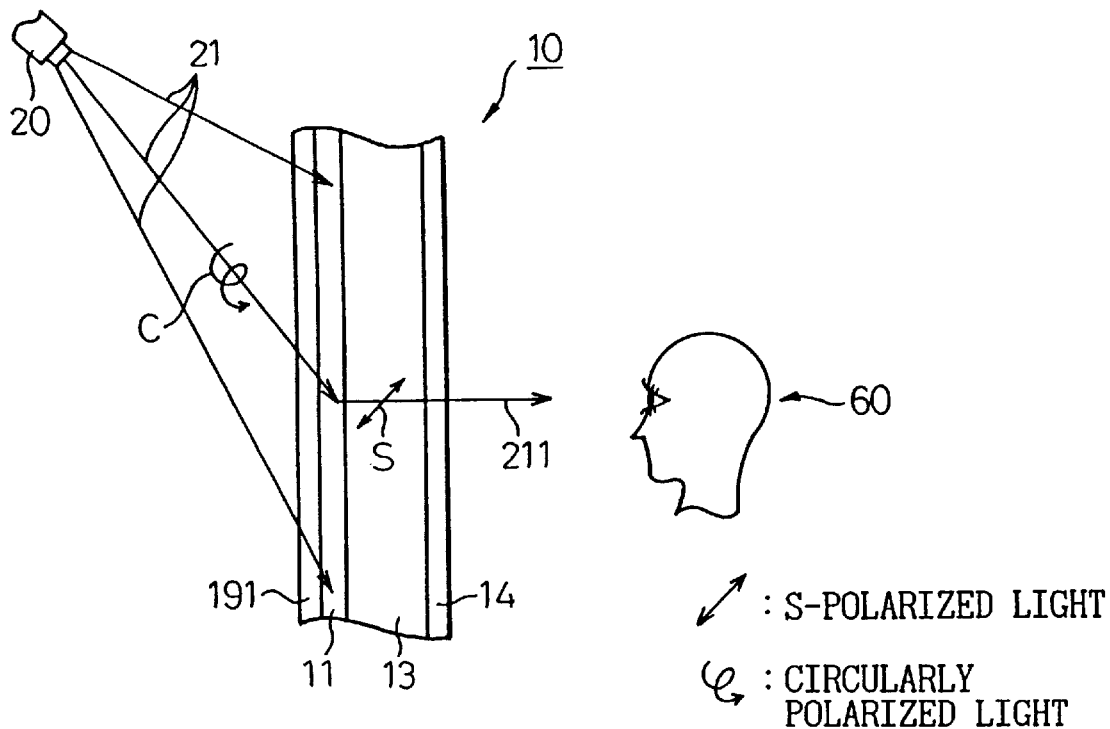
FIG. 19 shows an essential structure of a display apparatus according to the seventh embodiment of the first invention.

FIG. 19 shows an essential structure of a display apparatus according to the seventh embodiment of the first invention. In the drawing, reference number 191 denotes a ¼ λ-wave plate which is provided at the rear side of the hologram screen 10. Further, the circularly polarized light C (see a spiral line) is used as the signal light 21 emitted from the irradiation unit 20. In this case, the reflection of the circularly polarized light C is very small at the surface of the ¼ λ-wave plate 191, and the light transmitted through the ¼ λ-wave plate 191 is converted to the S-polarized light S (see an arrow line).

Since the diffraction intensity of the hologram 11 for the S-polarized light S is larger than that of the circularly polarized light C and the P-polarized light, it is possible to improve the contrast of the image and to provide good appearance to the observer 60.

Figure 20:
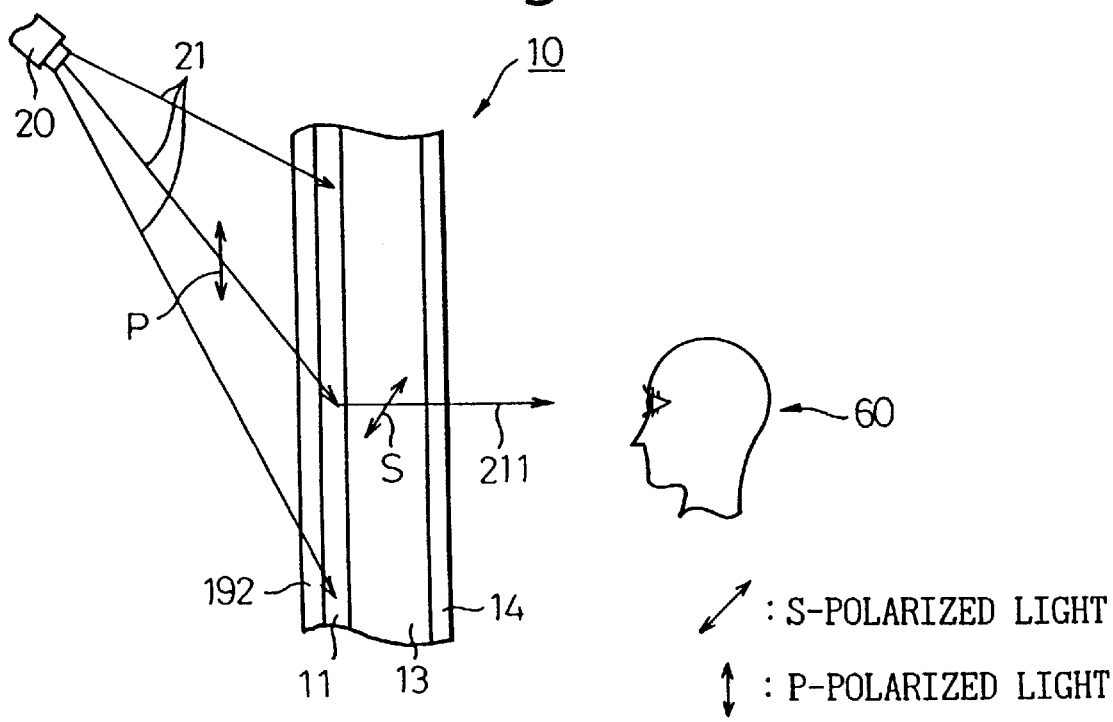
FIG. 20 shows a concrete example of the seventh embodiment according to the first invention.

FIG. 20 shows a concrete example of the seventh embodiment according to the first invention. In the drawing, reference number 192 denotes a ½ λ-wave plate which is provided at the rear side of the hologram screen 10 instead of the ¼ λ-wave plate 191. Further, the P-polarized light P (see an arrow line) is used as the signal light 21 emitted from the irradiation unit 20. In this case, the reflection factor of the P-polarized light can be reduced on the surface of the ½ λ-wave plate 192, and the light transmitted through the ½ λ-wave plate 192 is converted to the S-polarized light S. Accordingly, as well as the S-polarized light, it is possible to improve the image contrast and to apply good appearance to the observer 60.

The above mentioned examples can be applied to, for example, a transparent plate used in a show-window. Further, if the transparent substrate is not provided, it is possible to provide a display apparatus having a film-like structure.

Still further, in the above explanations, the luminous reflection factor Y (%) is usually defined by the following formula.

$$Y(\%) = 100 \int_{400}^{75} S(\lambda) R(\lambda) Y(\lambda) d\lambda / \int_{400}^{750} Y(\lambda) d\lambda$$

Where, $S(\lambda)$ is a flat light source, $R(\lambda)$ is a spectral reflection factor, and $Y(\lambda)$ is a color matching function in the CIE standard regulated on 1931.

The following descriptions are given of the second invention.

Before describing preferred embodiments of the second invention, the subjects to be solved in the second invention will be explained in detail with reference to FIGS. 29 to 31.

Figure 29:
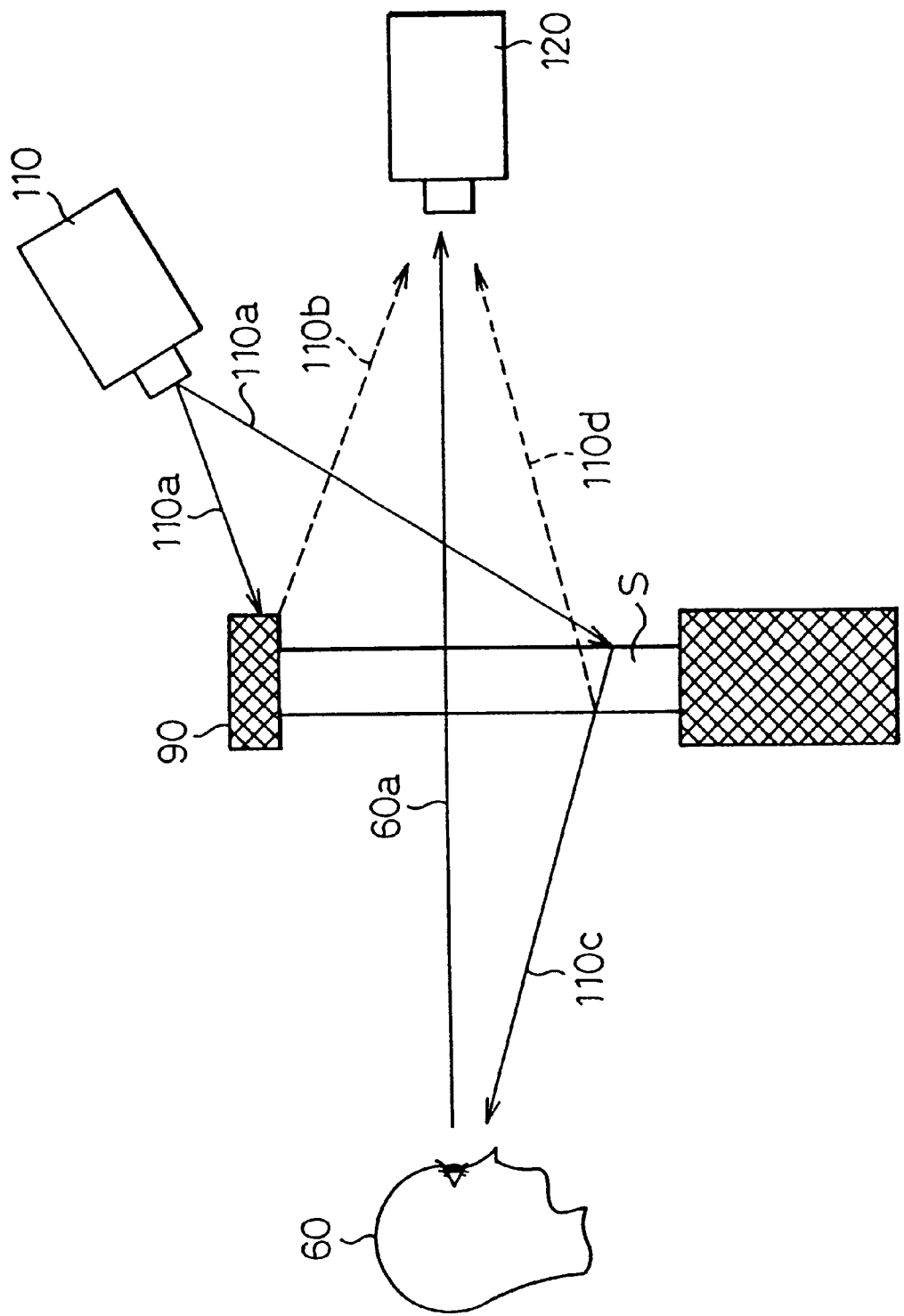
FIGS. 29 to 31 are views for explaining subjects to be solved by the second invention.
Figure 30:
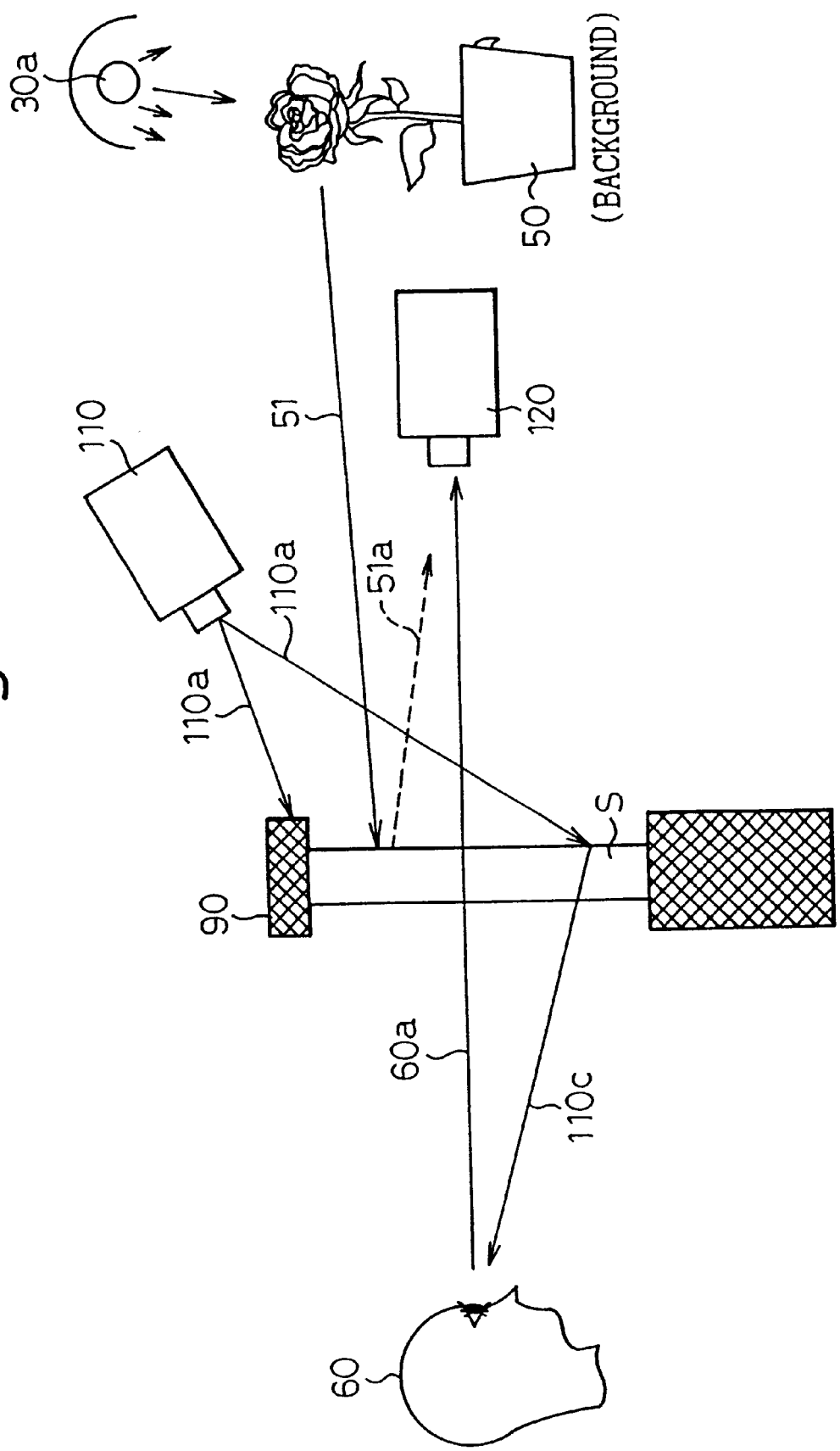
Figure 31:
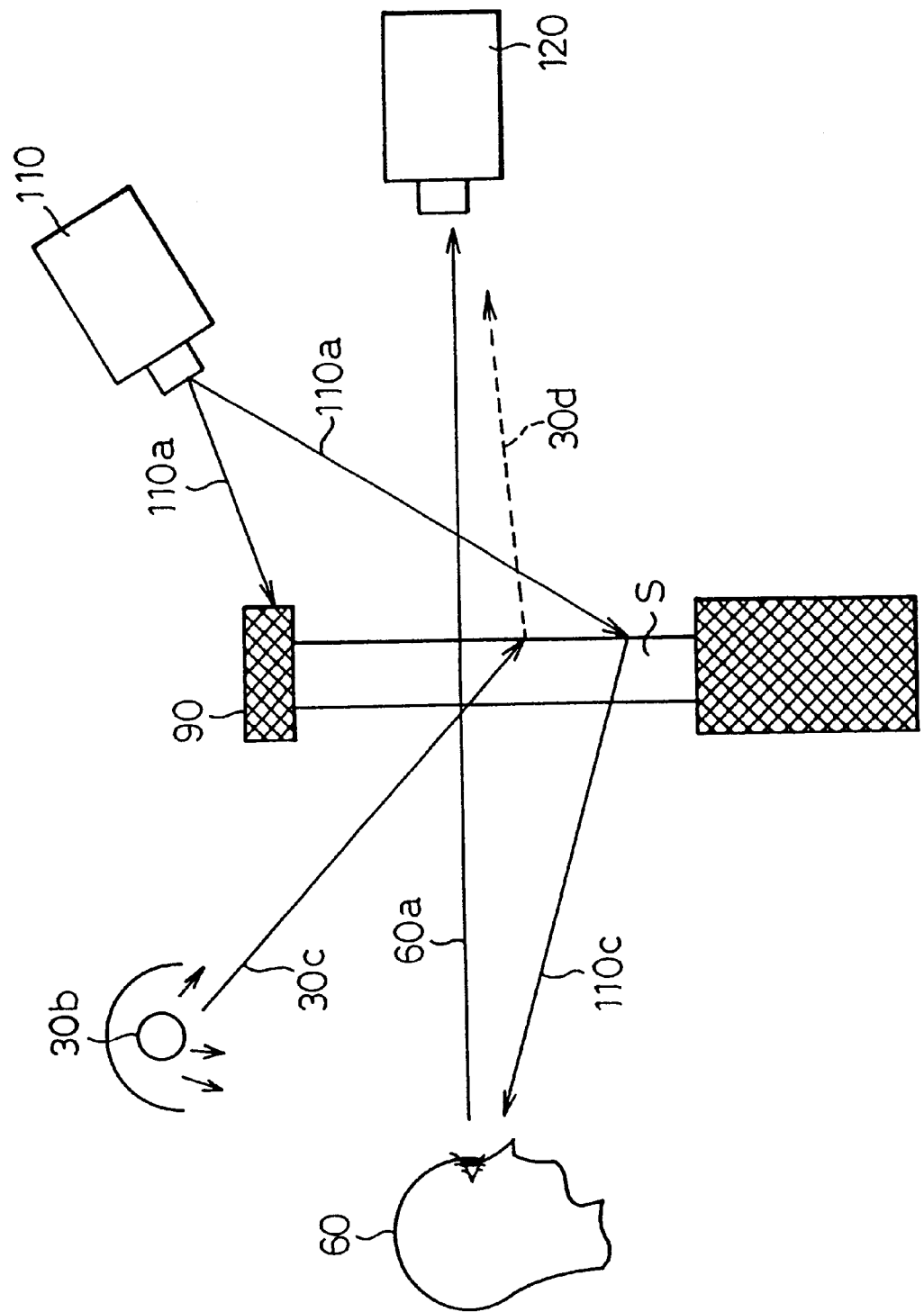

FIGS. 29 to 31 are views for explaining subjects to be solved by the second invention. When only the image of the observer is recorded through the display apparatus S, there are the following subjects to be solved as explained below. That is, as shown in FIG. 29, when the image (see an arrow line 60a) including the observer 60 is taken by an image input unit 120 through the display apparatus S, the reflected light (see a dotted line 110d) and another reflected light (see a dotted line 110b) are also input to the image input unit 120 as noise components. In this case, the reflected light 110d occurs when the image light 110c is reflected by another surface of the display apparatus S, and another reflected light 110b occurs when the image light 110a is reflected by a support member 90 which supports the display apparatus S.

Further, as shown in FIG. 30, when the image input unit 120 and the background (i.e., a flower) 50 are exposed by the light of a lamp 30a, the image 51 from the background 50 and the image input unit 120 is reflected on the surface of the display apparatus S, and the reflected light 51a is input to the image input unit 120 as noise components.

Still further, as shown in FIG. 31, when a lamp 30b is provided to the observer's side 60 (i.e., the lamp is provided to the side opposite to the image input unit 120), the irradiated light 30c from the lamp 30b is input to the display apparatus S so that the scattered light 30d occurs (see a dotted line) at the side of the image input unit 120. Accordingly, the scattered light 30d is also input to the image input unit 120 as noise components, and the noise components overlaps with the image of the observer. Those noise components and the image overlapped by the noise light are also input to the image input unit 120.

As explained above, there is a subject in which various noise components are also recorded on the image as overlapped images even though only the image of the observer is required to record on the image input unit 120.

Accordingly, the object of the second invention is to provide an improved image input unit which can record only a desired clear image.

Various embodiments according to the second invention will be explained in detail with reference to the drawings.

Figure 24:
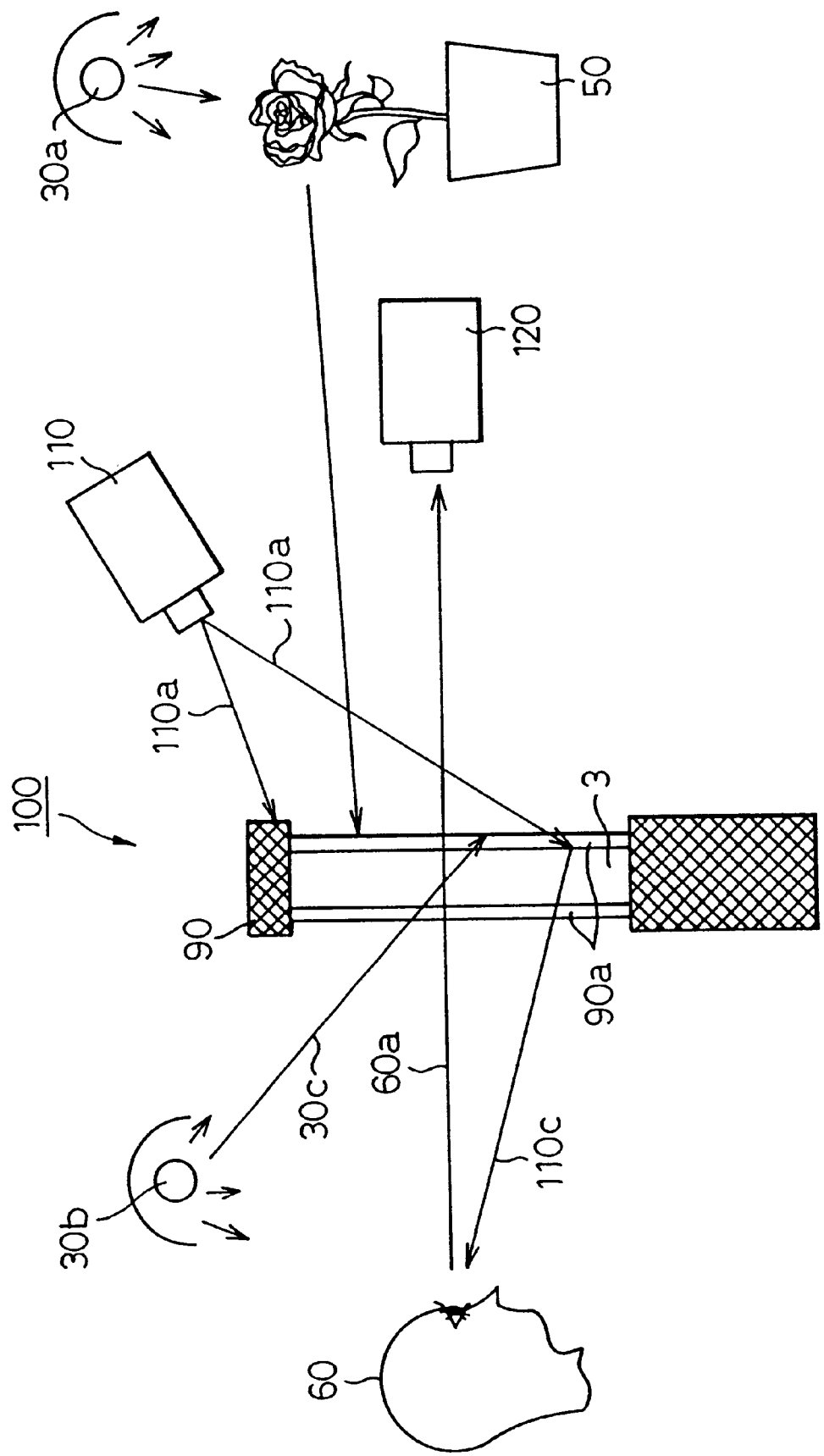
FIG. 24 shows an image input apparatus using a screen according to the first embodiment of the second invention.

FIG. 24 shows an image input apparatus using a screen according to the first embodiment of the second invention. Concretely, this drawing shows a receiver at one side in the TV telephone system. In this image input apparatus, the observer (i.e., a speaker) can communicate with another observer (i.e., another speaker) while reviewing the speaker's face.

In FIG. 24, the same reference numbers used in FIGS. 29 to 31 are attached to the same components in this drawing, reference number 100 denotes an image input unit including the transmitting type hologram screen. 90a is a reflection preventing member used in the second invention. 110 is a projector used as an irradiating unit, 120 is an image input unit, 3 is a screen used as a display, and 60 is the observer (i.e., speaker). The projector 110 is arranged to the viewpoint (see the point B in FIG. 14B), and the image input unit 120 is arranged to the viewpoint (see the point C in FIG. 14C).

As explained in FIGS. 14A to 14C, the observer 60 existing on another side of the screen 3 observes the image projected on the screen 3 by the projector provided in the non-transparent viewfield area 3a of the screen 3. On the other hand, the image input unit 120 captures the image of the observer 60 through the transparent viewfield area 3b. As a result, since it is possible to say that the observer 60 sees the image input unit 120 through the screen 3, it is possible to coincide the observer's viewline with the image input unit 120 (i.e., a camera) so that it is possible to also coincide the observer's (i.e., speaker's) viewline with another observer's (i.e., another speaker's) viewline.

There is, however, a subject to be solved in this embodiment. That is, when the projector is provided to the slant and upper position (see the unit 110 in FIG. 24), the image projected by the projector becomes narrow at the upper area of the screen 3 and becomes wide at the lower area of the screen 3. As a result, the image is deformed to a trapezoidal shape on the screen 3.

As a solution to this deformation of the image, there are known two representative methods, i.e., one being a method of previously correcting the image so as to become an anti-trapezoidal shape before the image is input to the projector, and the other being a method of adding a correction circuit for trapezoidal shape to the projector so as to eliminate the deformation. In this embodiment, the former was employed in order to correct the trapezoidal shape on the screen 3.

Next, the feature of this embodiment is explained in detail below. As explained above, there is a subject to be solved. That is, the information to be displayed (below, display information) from the projector 110 is displayed to the observer 60 through the screen 3. In this case, a part of the display information from the projector 110 is reflected in both surfaces (i.e., the front and rear surfaces) of the screen 3, and the reflected light becomes noise components so that the noise components are input to the image input apparatus 120.

Accordingly, as a solution for this subject, in this embodiment, the reflection preventing member 90a, which is used as the noise eliminating means, is provided to both surfaces of the screen 3 in order to provide clear image to the observer and to suppress noise components. As a result, it is possible to reduce the reflected light 110d and 51a (see FIGS. 29 and 30) by providing the reflection preventing member 90a to both surfaces of the screen 3.

In this case, it may be possible to use a reflection preventing film or reflection preventing glass as the reflection preventing member 90a. Further, it may be possible to provide a reflection preventing process to the display apparatus itself.

When the reflection factor of the reflection preventing member 90a is lower, it is possible to clarify the image input to the image input unit 120. In this case, when the reflection factor is 2% or less, it is possible to obtain good appearance in which the observer does not notice above noise components.

Figure 25:
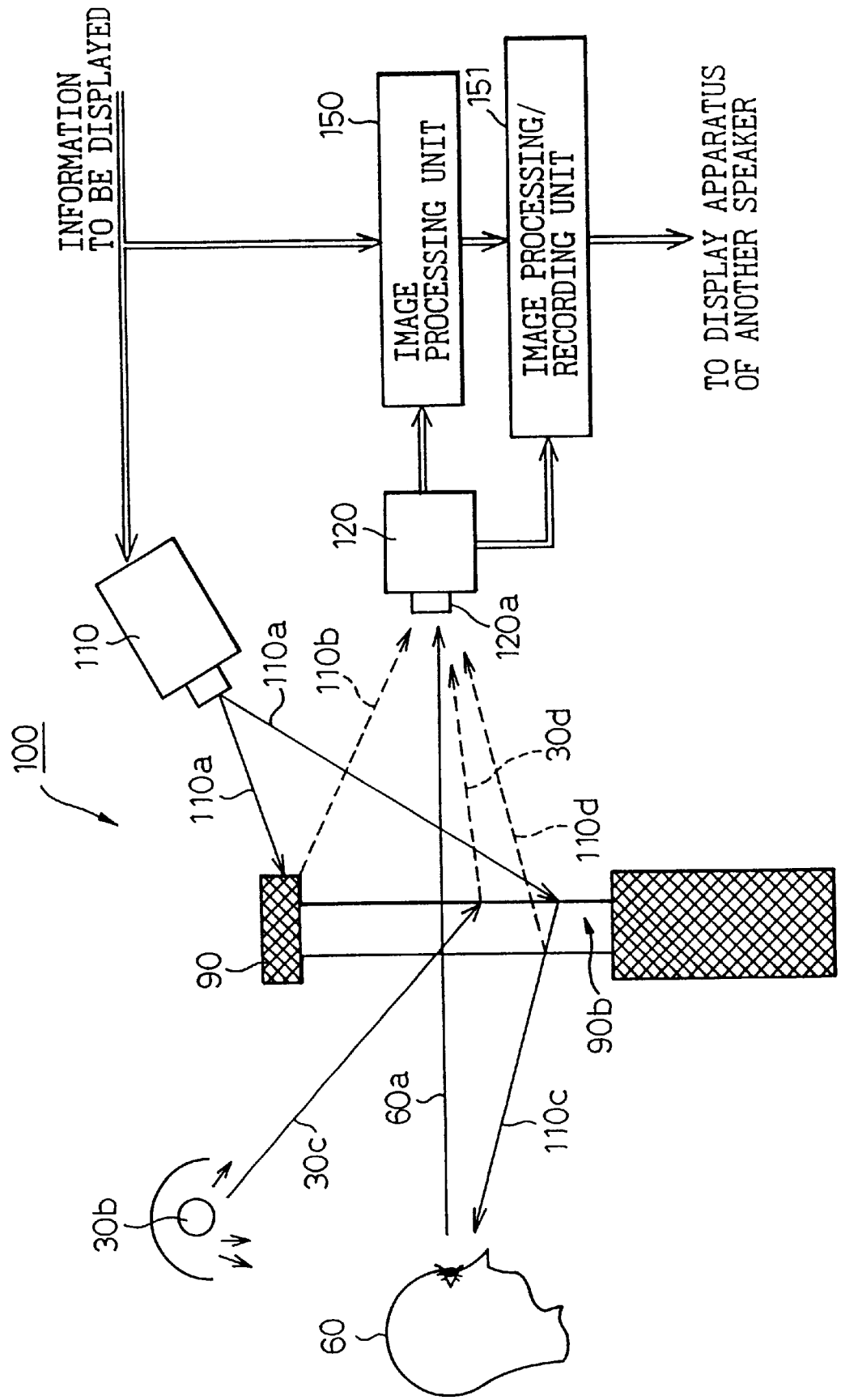
FIG. 25 shows an image input apparatus using a hologram screen according to the second embodiment of the second invention.

FIG. 25 shows an image input apparatus using a hologram screen according to the second embodiment of the second invention.

As shown in FIG. 25, the image input apparatus includes the projector 110 which generates the signal light 110a in which the information to be displayed (i.e., display information) are recorded, the transparent and light-transmitting type hologram screen in which a diffusion plate is recorded, and the image input unit 120 which see through the observer 60 from one side to another side of the hologram screen 90b and takes the observer's image.

Further, the viewline 60a coupling the vicinity of observer's eyes to the center of the image input unit 120 approximately coincides with the line connecting the focus center on the hologram screen 90b to the vicinity of observer's eyes.

The operation of this apparatus will be explained in detail below.

The signal light 110a from the projector 110 is irradiated on the hologram screen 90b. Since the diffusion plate is recorded on the hologram screen 90b, the diffusion light 110c is diffused in the range of the diffusion angle of the diffusion plate. The display information can be recognised by the observer 60 within the range of the diffusion angle. Accordingly, in the hologram screen 90b, a matching process between the incident angle of the signal light 110a and the diffraction characteristic is performed so that the center angle of the diffusion light (i.e., the direction in which the intensity of the diffusion light 110c is maximum.) is directed to the observer 60.

Further, the hologram screen 90b can act as only transparent plate for the light, except for the incident light of the signal light 110a, due to the characteristic of the hologram. Accordingly, since an input portion 120a of the image input unit 120, which is provided to one side of the hologram screen 90b, is directed to the observer 60, it is possible to capture a colored image of the observer 60 from the image input unit 120 in coincidence with the observer's viewline which is directed to the hologram screen 90b.

Still further, although the observer 60 can observe the background at one side of the hologram screen 90b, it is possible to recognize only the displayed image without particular attention by the observer by setting the brightness of the display information to the brightness which is much larger than the brightness of one side of the hologram screen 90b.

Further, different from the conventional art, since it is possible to easily coincide the direction of the camera 120 with the observer's viewline, it is possible to coincide the observer's viewline with another observer's viewline which is displayed on the display apparatus. Accordingly, it is possible to realize a natural conversation with another observer (i.e., speaker) according to the present invention.

Next, the noise eliminating means according to the second embodiment of the second invention will be explained in detail below.

Figure 26:
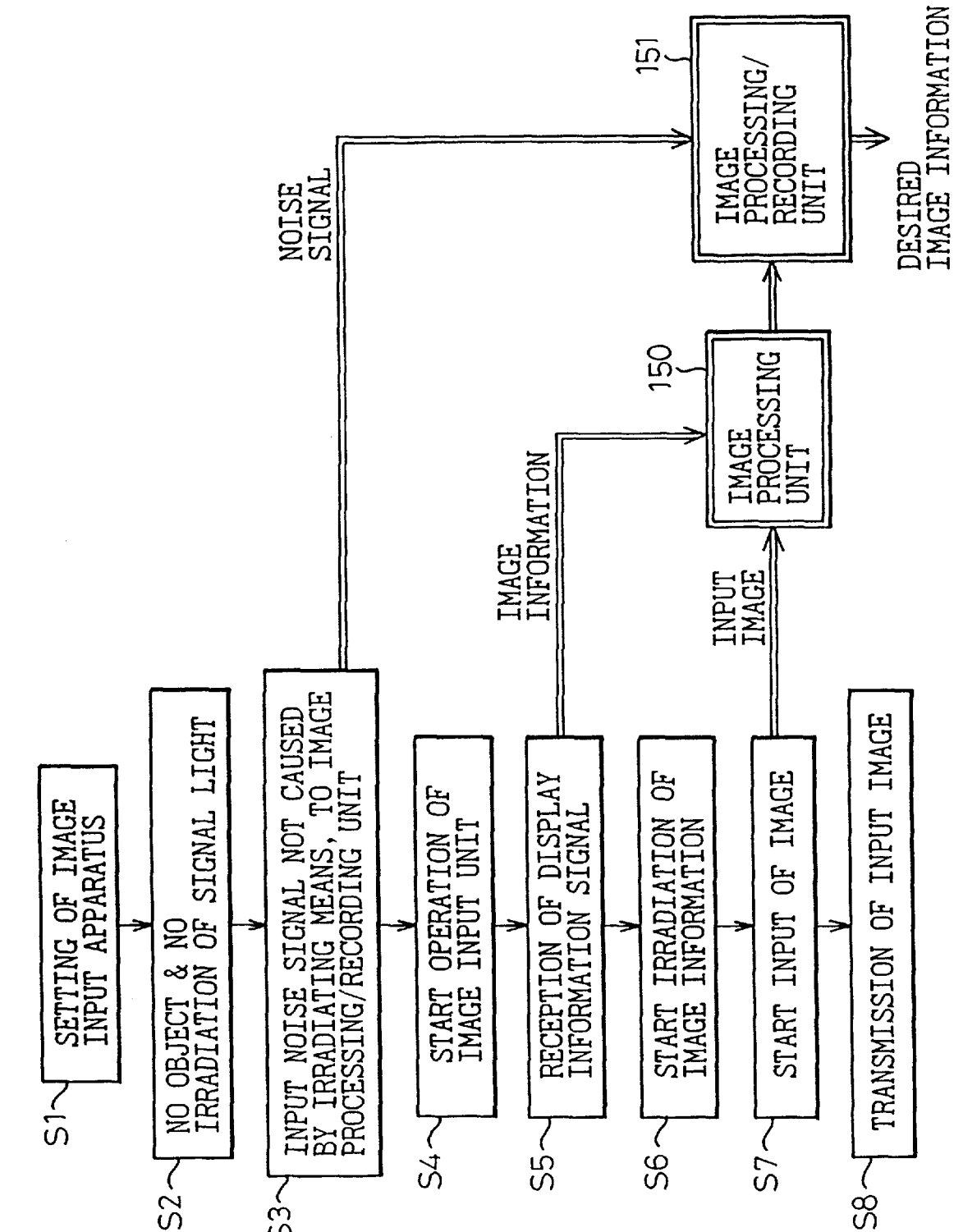
FIG. 26 is a view for explaining the operation of the second embodiment of the second invention.

FIG. 26 is a view for explaining the operation of the second embodiment of the second invention. In this embodiment, an image processing circuit 150 and an image processing and recording circuit 151 are used as the noise eliminating means. The image processing circuit 150 can handle the digital information, and receives the display information which is input to the projector 110 and the image signal from the image input unit 120. Further, the image processing circuit 150 can erase noise components caused by the signal light 110a generated from the projector 110 in accordance with the digital process.

The image processing and recording apparatus 151 handles the signal light and the image signal light from the image processing circuit 150 in accordance with the digital process. In the former signal light, noise components on the hologram screen 90b are recorded on the signal light in the state that no signal light 110a from the projector 110 is provided. Accordingly, it is possible to eliminate noise light not caused by the projector and to output the desired image information signal.

As shown in FIG. 26, the image input apparatus 100 of the second embodiment is operated as follows.

In step 1, an adjustment process which adjusts the optical focus, etc., is performed so that the display information of the image input apparatus 100 can be clearly projected on the hologram screen 90b.

In step 2, in the other side of the hologram screen, i.e., the observer's side is set to either a state in which there is no observer 60 (i.e., no subject to be imaged), or a state in which there is no irradiation of the display information.

In step 3, the image which is input to the image apparatus 120 is recorded as the first noise components. Further, the noise signal which is not caused by the irradiating unit is input to the image processing and recording circuit 151.

In step 4, the image input apparatus 100 is operated.

In step 5, the image signal from the image input apparatus of another observer (i.e., speaker) is received, and the display signal which becomes the second noise components is input to the image processing unit 150.

In step 6, the received display information is displayed by the projector 110 on the hologram screen 90b.

In step 7, the image is input by the image unit 120.

Accordingly, noise components which exist at one side of the hologram screen 90b are also included in the desired image with the observer input to the image input unit 120.

However, the display information corresponding to the second noise components are previously input to the image processing circuit 150 in step 5. Accordingly, in the image processing circuit 150, it is possible to easily eliminate the second noise components, which correspond to noise components of the display information, from the input image to the image apparatus 120.

Further, for example, the first noise components, which are caused by projection to the hologram screen 90b from the image unit 120 itself, are recorded in the image processing and recording circuit 151. Accordingly, it is possible to eliminate the first noise components except for the desired image components from the image components input to the image unit 120, in the image processing and recording circuit 151.

As mentioned above, by using the image input apparatus 100 of the second embodiment, it is possible to obtain clear image which can suppress noise components in the desired image.

Figure 27:
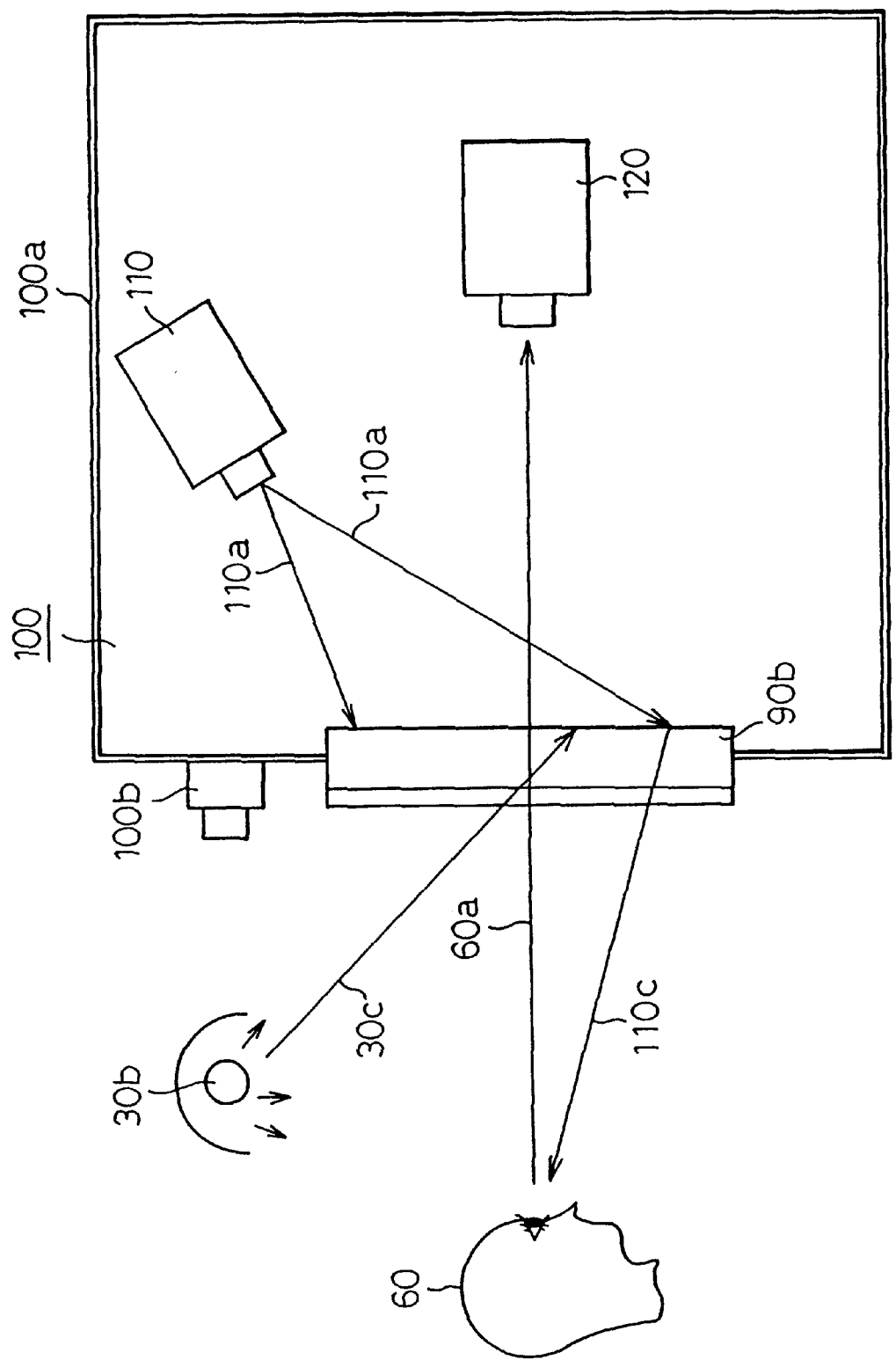
FIG. 27 is a view for explaining the second embodiment of the second invention.

FIG. 27 is a view for explaining the second embodiment of the second invention. The hologram screen applied to the second embodiment is also used as the display apparatus in this embodiment. Further, as the first noise eliminating means, the projector 110 and the image input unit 120 are provided within a box 100a. In this case, the box 100a is positioned to another side of the hologram screen 90b (i.e., a side opposite to the observer as shown in FIG. 27). Further, an internal wall of the box 100a is colored by black coating material so that it is possible to realize noise eliminating means.

According to this structure, it is possible to suppress the problem that the image unit 120 itself within the box 100a and the background around the image unit 120 are input to the display image as the noise components. Further, even if the observer 60 watches the inside of a hologram screen 90b, it is possible to provide the structure in which is difficult to see the image unit 120 so that it is possible to realize natural conversation in the TV telephone system.

Further, it is possible to carry the hologram screen 90b with the box 110a so that it is possible to easily set the system.

Still further, as the second noise eliminating means, an amount of light detecting unit is provided in order to detect an amount of the light at another side of the display apparatus. Further, it may be possible to provide noise eliminating unit for controlling the power irradiated by the irradiation unit by inputting the detected signal to the irradiating unit 110.

Figure 28:
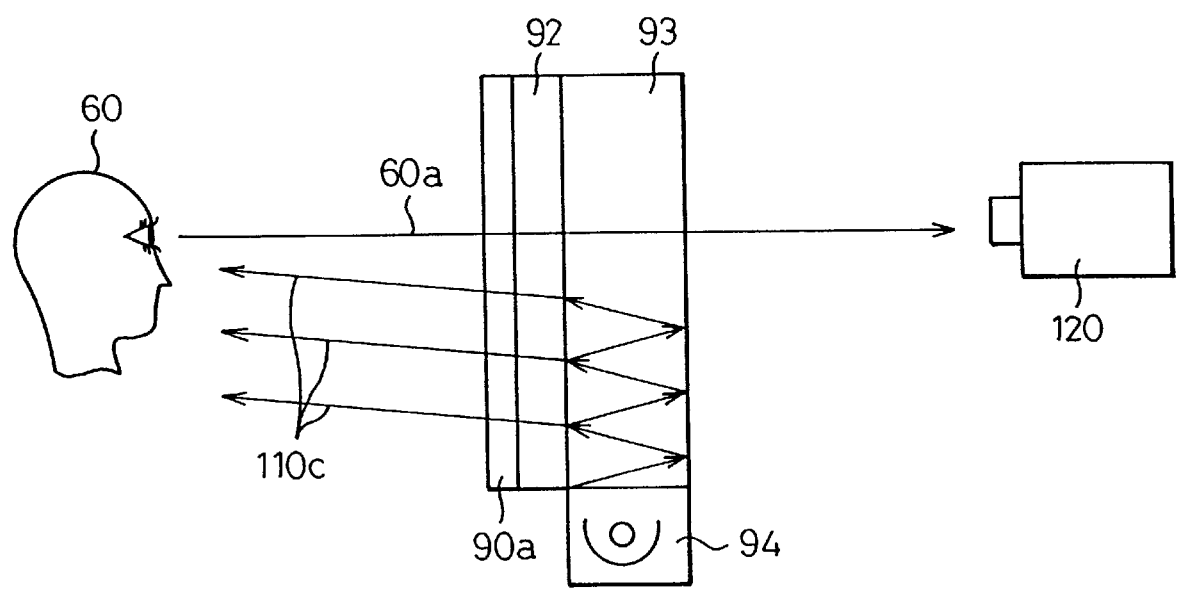
FIG. 28 is a view for explaining the third embodiment of the second invention.

FIG. 28 is a view for explaining the third embodiment of the second invention. The image input apparatus according to the third embodiment is different from the structure of FIG. 27. In FIG. 28, reference number 93 denotes a hologram guide which is provided to the side of the image input unit 120, and reference number 94 denotes a lamp which is provided to the side surface of the hologram guide 93. Further, reference number 92 denotes a liquid crystal display unit, and reference number 90a denotes a reflection preventing member.

As shown in the drawing, the incident light is irradiated from the side surface of the hologram guide 93, and reflected within the hologram guide 93 as shown by arrow lines. Accordingly, the surface of the liquid crystal display unit 92 is irradiated by the reflected light so that it is possible to recognize the image on the liquid crystal display apparatus 92.

As above-mentioned image input apparatus, it may be possible to utilize the noise eliminating means which physically eliminates noise components or which eliminates noise components by using the signal process as mentioned in the first and second embodiments as the noise eliminating means.

Further, the irradiating light to the liquid crystal display apparatus can be provided by the irradiating unit, or the light guide unit which guides the light within the optical member, or another light guide unit except for the hologram.

What is claimed is:

1. An image apparatus used in a display apparatus comprising:

an irradiating unit for generating signal light which records information to be displayed;

a display unit for displaying the signal light irradiated by irradiating unit;

an image input unit at one side of the display unit for inputting a desired object which exists at another side of the display unit, as an image signal; and a noise eliminating unit for eliminating at least a part of an image component except for the desired object;

wherein the noise eliminating unit is an image processing circuit for eliminating noise signals input by the image input unit; and wherein the image processing circuit inputs noise signals, which are observed from the one side of the display unit, to the image input unit when there is no object at the another side of the display unit and no irradiation light irradiated from the irradiating unit to the display unit;

after the noise signals are recorded, when the desired object exists at the another side of the display unit, the recorded noise signals are eliminated from the image signal, input by the image input unit.

* * * * *

UNITED STATES PATENT AND TRADEMARK OFFICE
CERTIFICATE OF CORRECTION

PATENT NO.    : 6,590,548 B1
DATED         : July 8, 2003
INVENTOR(S)   : Yasuhiro Mizutani et al.

It is certified that error appears in the above-identified patent and that said Letters Patent is hereby corrected as shown below:

<u>Title page,</u>
Item [75], Inventors, delete "Tooru Matsumoto" and "Kenichiro Takada"
Item [56], References Cited, U.S. PATENT DOCUMENTS, please add:
-- 3,928,867    12/1975    Lynch
5,057,744    10/1991    Barbier et al
5,532,736    7/1996    Kuriki et al --

FOREIGN PATENT DOCUMENTS, please add:
-- EP    0493893    7/1992
EP    0733928    9/1996
FR    2705484    11/1994 --

Signed and Sealed this

Second Day of March, 2004

JON W. DUDAS
*Acting Director of the United States Patent and Trademark Office*